(12) United States Patent
Ikeda

(10) Patent No.: US 8,885,879 B2
(45) Date of Patent: Nov. 11, 2014

(54) OBJECT POSITION ESTIMATION DEVICE, OBJECT POSITION ESTIMATION METHOD AND PROGRAM

(75) Inventor: Hiroo Ikeda, Minato-ku (JP)

(73) Assignee: NEC Corporation, Tokyo (JP)

( * ) Notice: Subject to any disclaimer, the term of this patent is extended or adjusted under 35 U.S.C. 154(b) by 512 days.

(21) Appl. No.: 13/265,486

(22) PCT Filed: Apr. 21, 2010

(86) PCT No.: PCT/JP2010/057524
§ 371 (c)(1),
(2), (4) Date: Oct. 20, 2011

(87) PCT Pub. No.: WO2010/126071
PCT Pub. Date: Nov. 4, 2010

(65) Prior Publication Data
US 2012/0051598 A1    Mar. 1, 2012

(30) Foreign Application Priority Data

Apr. 28, 2009   (JP) .................................. 2009-109827

(51) Int. Cl.
| | | |
|---|---|---|
| *G06K 9/00* | (2006.01) | |
| *G06T 17/00* | (2006.01) | |
| *G01B 7/00* | (2006.01) | |
| *G01B 9/00* | (2006.01) | |
| *G06T 7/20* | (2006.01) | |
| *G01B 11/00* | (2006.01) | |

(52) U.S. Cl.
CPC ..... G01B 11/002 (2013.01); *G06T 2207/10021* (2013.01); G06T 7/2086 (2013.01)
USPC ............ 382/103; 382/107; 382/154; 382/228

(58) Field of Classification Search
CPC ..... G06T 7/004; G06T 7/0065; G06T 7/0071; G06T 7/0075; G06T 7/20; G06T 7/2086; G06T 7/2093; G06K 9/00624; G06K 9/00771; G06K 9/00778; G06K 9/00785
USPC .................................. 382/103, 107, 154, 228
See application file for complete search history.

(56) References Cited

U.S. PATENT DOCUMENTS

2003/0053658 A1* 3/2003 Pavlidis ........................ 382/103
2005/0265582 A1* 12/2005 Buehler et al. ................ 382/103

FOREIGN PATENT DOCUMENTS

| JP | 2008-015573 A | 1/2008 |
|---|---|---|
| JP | 2008-176504 A | 7/2008 |

OTHER PUBLICATIONS

Khan, et al.. "Consistent Labeling of Tracked Objects in Multiple Cameras with Overlapping Fields of View." IEEE Transactions on Pattern Analysis and Machine Intelligence 25 (): 1355-160. Print.*

(Continued)

*Primary Examiner* — Michael A Newman
(74) *Attorney, Agent, or Firm* — Sughrue Mion, PLLC

(57) ABSTRACT

In a technology of acquiring an object position by a visual cone intersection method, an object position estimation device which reduces estimation of incorrect position due to ghost image objects is provided, wherein an object candidate acquisition means estimates an object position by a visual cone intersection method and acquires a candidate object, an object candidate information storage means which stores information on overlap among the candidate objects for the visual cone of the object which is acquired based on the captured image, a degree of co-movement acquisition means acquires an index as a degree of co-movement which is calculated based on number of visual cones including other candidate objects which co-move with a movement of the candidate object and indicates interrelation among candidate objects for candidate objects, and a candidate object determination means identifies said candidate object as either an object or a non-object by a posteriori probability based on the acquired index and outputs position of said candidate object which is determined as an object.

15 Claims, 20 Drawing Sheets

(56) References Cited

OTHER PUBLICATIONS

Khan, et al.. "A Multiview Approach to Tracking People in Crowded Scenes Using a Planar Homography Constraint." Lecture Notes in Computer Science, ECCV 3954 (): 133-146. Print.*

Khan, et al. "Consistent Labeling of Tracked Objects in Multiple Cameras with Overlapping Fields of View." IEEE Transactions on Pattern Analysis and Machine Intelligence. 25.10 (2003): 1355-1360. Print.*

Khan, et al. "A Multiview Approach to Tracking People in Crowded Scenes Using a Planar Homography Constraint." Lecture Notes in Computer Science, ECCV. 3954. (2006): 133-146. Print.*

S. Kubota, et al., "Chapter 3: Image Processing Technologies for the System, in Customer Trajectory Detection System Using Multiple Omnidirectional Cameras", Toshiba Review, 2008, pp. 44-47, vol. 63, No. 10.

Office Action, dated Sep. 17, 2013, issued by the Japanese Patent Office, in counterpart Application No. 2011-511427.

* cited by examiner

Fig.3

| NUMBER I OF CANDIDATE OBJECT $O_i$ | x COORDINATE ON THE PLANE | y COORDINATE ON THE PLANE |
|---|---|---|
| 1 | 200 | 50 |
| 2 | 220 | 170 |
| 3 | 110 | 150 |

| NUMBER I OF CANDIDATE OBJECT $O_i$ | NUMBER c OF IMAGE ACQUISITION MEANS | PRESENCE OF OVERLAP AND PRESENCE OF FIELD OF VIEW | NUMBER OF CANDIDATE OBJECT IN THE OVERLAPPING STATE |
|---|---|---|---|
| 1 | 1 | 0 | — |
| 1 | 2 | 1 | 2. 3 |
| 2 | 1 | 1 | 3 |
| 2 | 2 | 1 | 1 |
| 3 | 1 | 1 | 2 |
| 3 | 2 | — | — |

OBJECT POSITION ESTIMATION DEVICE, OBJECT POSITION ESTIMATION METHOD AND PROGRAM

CROSS REFERENCE TO RELATED APPLICATIONS

This application is a National Stage of International Application No. PCT/JP2010/057524 filed Apr. 21, 2010, claiming priority based on Japanese Patent Application No. 2009-109827 filed Apr. 28, 2009 the contents of all of which are incorporated herein by reference in their entirety.

THE TECHNICAL FIELD

The present invention relates to an object position estimation device which estimates position of an object using a plurality of camera images, an object position estimation method and a program.

BACKGROUND ART

Conventionally, an object position estimation device, an object position estimation method and a program are utilized in order to estimate position (i.e. position to a floor plane) of target objects in image monitoring systems. A technology in relation to this kind of object position estimation device is disclosed in the Japanese Patent Application Laid-Open No. 2008-15573 (henceforth, referred to as "pertinent art"). In the pertinent art, it disclosed an invention of a device which determines existence of target objects in a real space using a plurality of camera images, and estimates position of the target objects. Following to a method of a device which estimates position of a target object according to the pertinent art, it arranges a plurality of cameras so that field of view of each camera overlaps each other in a real space (i.e. three dimensional spaces) where the position estimation is performed. Then, a moving object area of the target object is extracted from image acquired from each camera by using an image processing including a background subtraction method and a frame difference method.

Each camera is in a state in which the camera calibration is performed in advance so that the coordinate of the camera image of the two dimensions and the real space of the three dimensions can be mutually converted. Each camera captures the target object at this state. Next, a device according to the pertinent art reversely projects the image including moving object areas extracted from each camera to a plane where it is designated in the real space. Next, the device according to the pertinent art detects an overlap of the reversely projected moving object areas from all cameras on each plane. In this way, the device according to the pertinent art determines existence of the moving object areas (target objects) in the real space and estimates position of the objects.

DISCLOSURE OF THE INVENTION

Problem which the Invention Tries to Settle

In the case that a user implements the method described in the pertinent art, following problems may occur. The device according to the pertinent art has a possibility to detect ghost image objects, as shown in FIG. 1 as an example, in addition to actual target objects for the objects in the real space which are acquired from the overlap of the reversely projected moving object areas. Because the device according to the pertinent art may estimate object positions from these ghost image objects, a user may receive incorrect information in this case. Followings describe a reason why such problem may occur.

The detection of the ghost image object by a device as shown in FIG. 1 according to the pertinent art is caused by a process that the reverse projection (i.e. visual cone) of the moving object area is done to a wide range of area including the actual target object in the real space as shown in area S in FIG. 1 as an example. Therefore, depending on relative positional relationships in position and direction of a camera A and a camera B and the actual target object, in the real space, it will form ghost image objects which are different from the target objects.

The present invention was invented in view of the above-mentioned technical problem, and an object is to provide an object position estimation device, an object position estimation method and a program which can reduce frequency of incorrect position estimation based on the ghost image objects, in a technology of acquiring object positions using a visual cone intersection method.

Means for Settling the Problem

In order to settle the above-mentioned problem, an object position estimation device according to the present invention is provided, wherein the device is comprising of: a candidate object acquisition unit which estimates object positions by a visual cone intersection method and acquires candidate objects; a candidate object information storage unit which stores information on overlap among the candidate objects for a visual cone of objects which is acquired based on captured images; a degree of co-movement acquisition unit which acquires for candidate objects an index as a degree of co-movement which is calculated based on number of visual cones including other candidate objects which co-move with a movement of the candidate objects and indicates interrelation among candidate objects; and an object candidate determination unit which identifies the candidate object as either objects or non-objects by posteriori probabilities based on the acquired index and outputs the position of the candidate objects which is determined as objects.

In addition, the object position estimation method according to the present invention comprising estimating an object position by a visual cone intersection method and acquires candidate objects, storing information on overlap among the candidate objects for the visual cone of the objects acquired based on captured images, acquiring an index as a degree of co-movement for candidate objects which is calculated based on number of visual cones including other candidate objects which co-move with a movement of the candidate object and indicates interrelation among candidate objects, identifying the acquired candidate object as either objects or non-objects by the posteriori probabilities based on the acquired index, and outputting the position of the candidate objects which is determined as objects.

In addition, a program according to the present invention forces a computer to execute: a candidate object acquisition process wherein object positions are estimated by the visual cone intersection method and candidate objects are acquired, a candidate object information storage process wherein information on overlap among candidate objects for a visual cone of the object acquired based on the captured image are stored, a degree of co-movement acquisition process wherein an index as a degree of co-movement which is calculated based on number of visual cones including other candidate objects which co-move with a movement of the candidate object are acquired and interrelation among candidate objects for candidate objects are indicated, and a candidate object determination process wherein candidate objects are identified as either objects or non-objects by the posteriori probabilities based on acquired index and outputs the position of the candidate object which is determined as objects.

Effects of the Invention

According to the present invention, for a technology of acquiring object positions using visual cone intersection method, (it can reduce)
a possibility of estimating an incorrect object position due to the ghost image objects can be reduced.

BRIEF DESCRIPTION OF THE DRAWINGS

FIG. 3 is a figure showing an example of information stored in an object candidate information storage means according to the first embodiment.

BEST MODE FOR CARRYING OUT THE INVENTION

First Exemplary Embodiment

Next, the first embodiment will described according to the present invention in detail with reference to the drawings.

Figure 1:
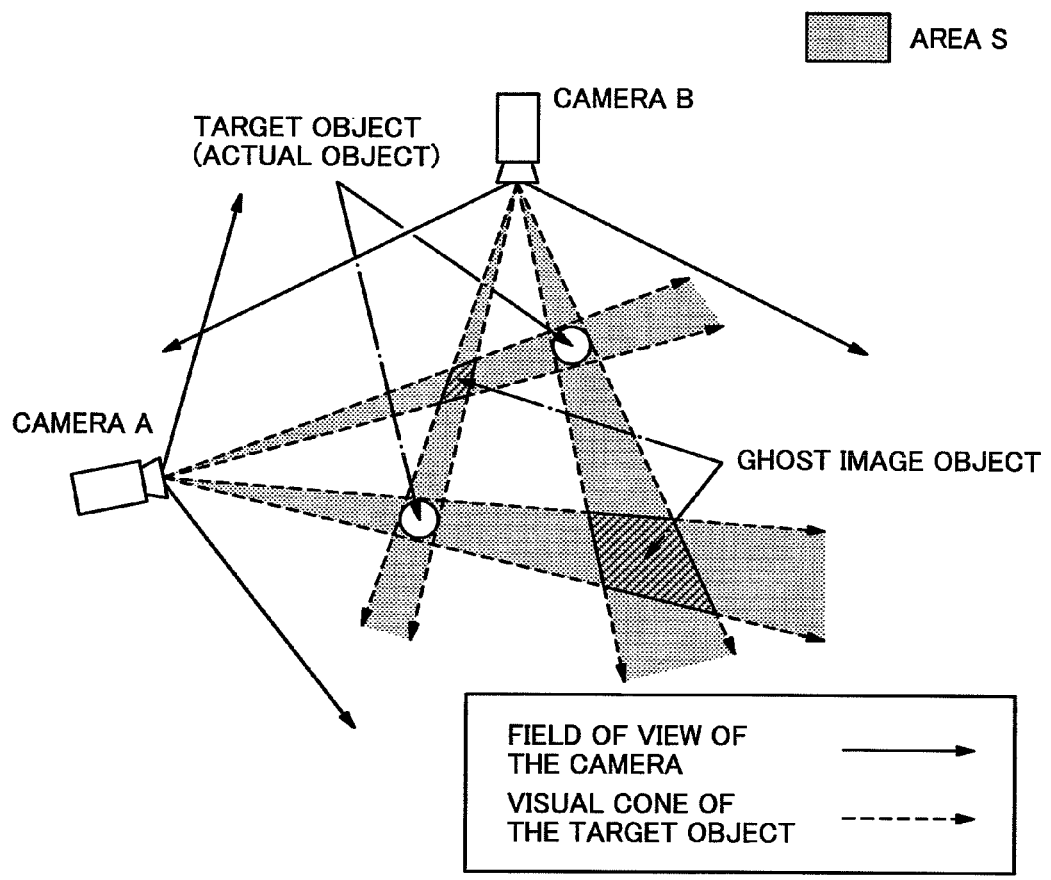
FIG. 1 is a figure showing a definition of a ghost image object and a created situation thereof, which is a problem of the pertinent art.
Figure 2:
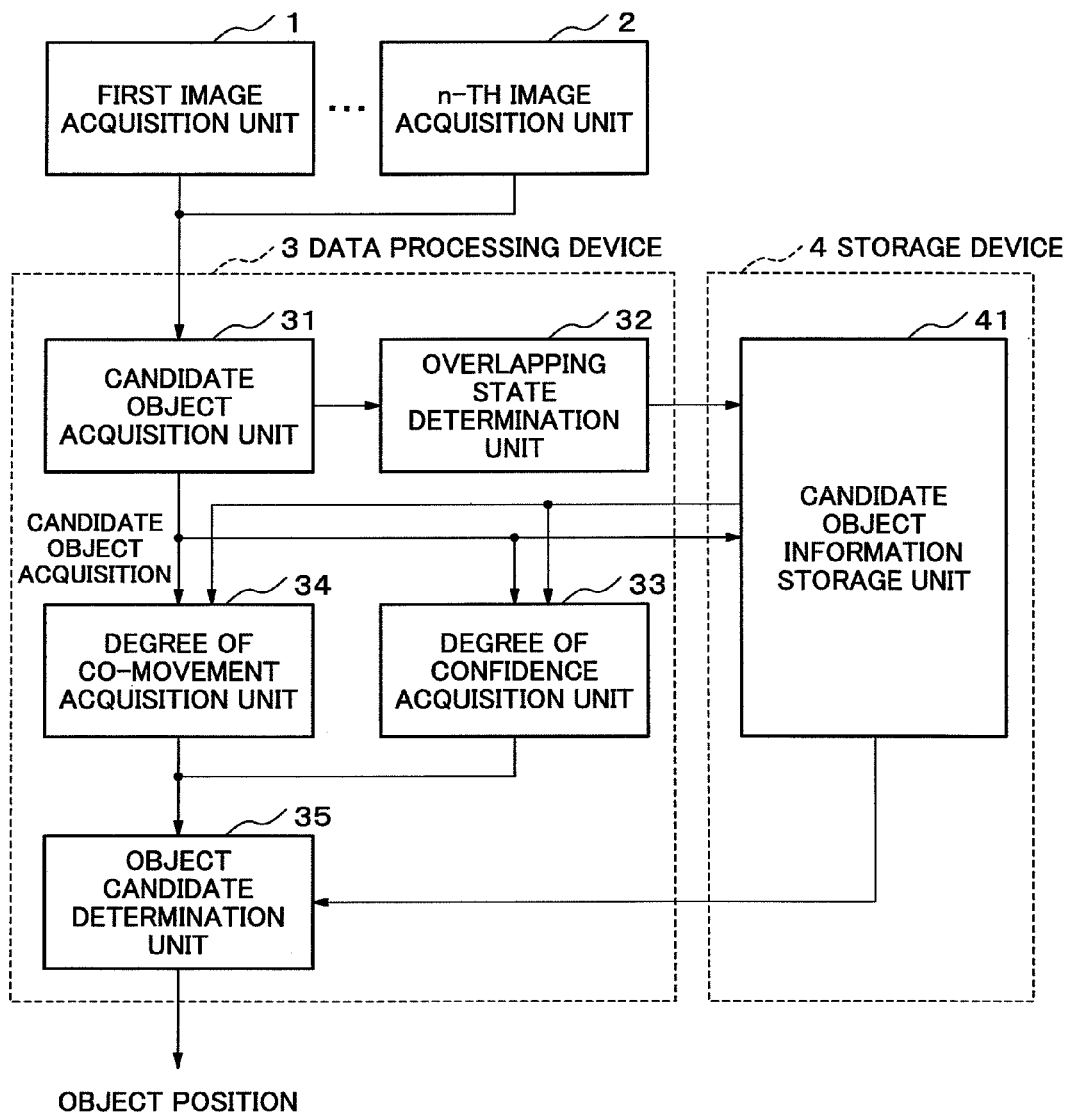
FIG. 2 is a block diagram showing a configuration according to a first embodiment of the present invention.

FIG. 2 is the block diagram showing the configuration according to the first embodiment. The first embodiment will described with reference to FIG. 2.

An object position estimation device according to the embodiment includes n number of image acquisition units including a first image acquisition unit to n-th image acquisition unit which acquire images from the moving images acquired by digital cameras or video cameras or the like, a data processing device 3 which is operated by a program control and a storage device 4 which stores information.

The storage device 4 includes a candidate object information storage unit 41. The candidate object information storage unit 41 recognizes an object position acquired from a candidate object acquisition unit 31 as the position in which the candidate of object (i.e. candidate object) exists, and stores the information on the candidate object with its position.

In addition, the candidate object information storage unit 41 stores such as positional information of a candidate object (i.e. coordinate on the plane) and information on a mutual overlap of the candidate object with other candidate objects. The information on the overlap means the overlap among the candidate objects for the visual cones which are created by the c-th image acquisition unit (c:1-n, where n is a natural number). The information on the overlap includes such as a presence of the overlap among the candidate objects for the visual cones which are created by the c-th image acquisition unit, a presence of candidate objects observed in the field of view of the c-th image acquisition unit (henceforth, a case that the candidate object is observed is referred as clear field of view, and a case that it is not as lack of field of view), and number of candidate objects in the overlapping state.

FIG. 3 shows an example of contents of the information. Where, i at the subscript of O in the table indicate:
i: 1-m, and m=3
Further, number c of the image acquisition means indicate:
c: 1-n, and n=2
In addition, numerals and symbols at each line of the presence of overlap and the presence of field of view are expressed by the following notations, respectively:
1: overlaps (clear field of view).
0: not overlaps (clear field of view)
-: lack of field of view
In addition, the candidate object information storage 41 stores above-mentioned information including information acquired in the past.

The data processing device 3 includes the candidate object acquisition unit 31, an overlapping state determination unit 32, a degree of confidence acquisition unit 33, a degree of co-movement acquisition unit 34 and an object candidate determination unit 35.

The candidate object acquisition unit 31 estimates positions of objects using the visual cone intersection method and acquires candidate objects. Specifically, the candidate object acquisition unit 31 synchronizes image capturing timing of the first image acquisition unit 1 and the n-th image acquisition unit 2 and acquires images from these image acquisition units. The candidate object acquisition unit 31 performs the image processing including background subtractions or the like to each of these images, and acquires the images which indicate the object areas. The candidate object acquisition unit 31 acquires object voxels (i.e. voxel which indicates the object) by the visual cone intersection method using camera parameters acquired in advance and the images which indicate the object areas.

Then, the candidate object acquisition unit 31 votes number of object voxels to positions on planes, executes threshold processing, labeling and centroid computation or the like, and estimates object positions. The candidate object acquisition unit 31 stores in the candidate object information storage unit 41 the respective object voxels at the position as the object voxel of which the candidate object is composed.

Although the description above indicated an example of the object position estimation (i.e. acquisition of the candidate object), any methods can be applied if the methods include estimating the object position using the visual cone intersection method.

Figure 4:
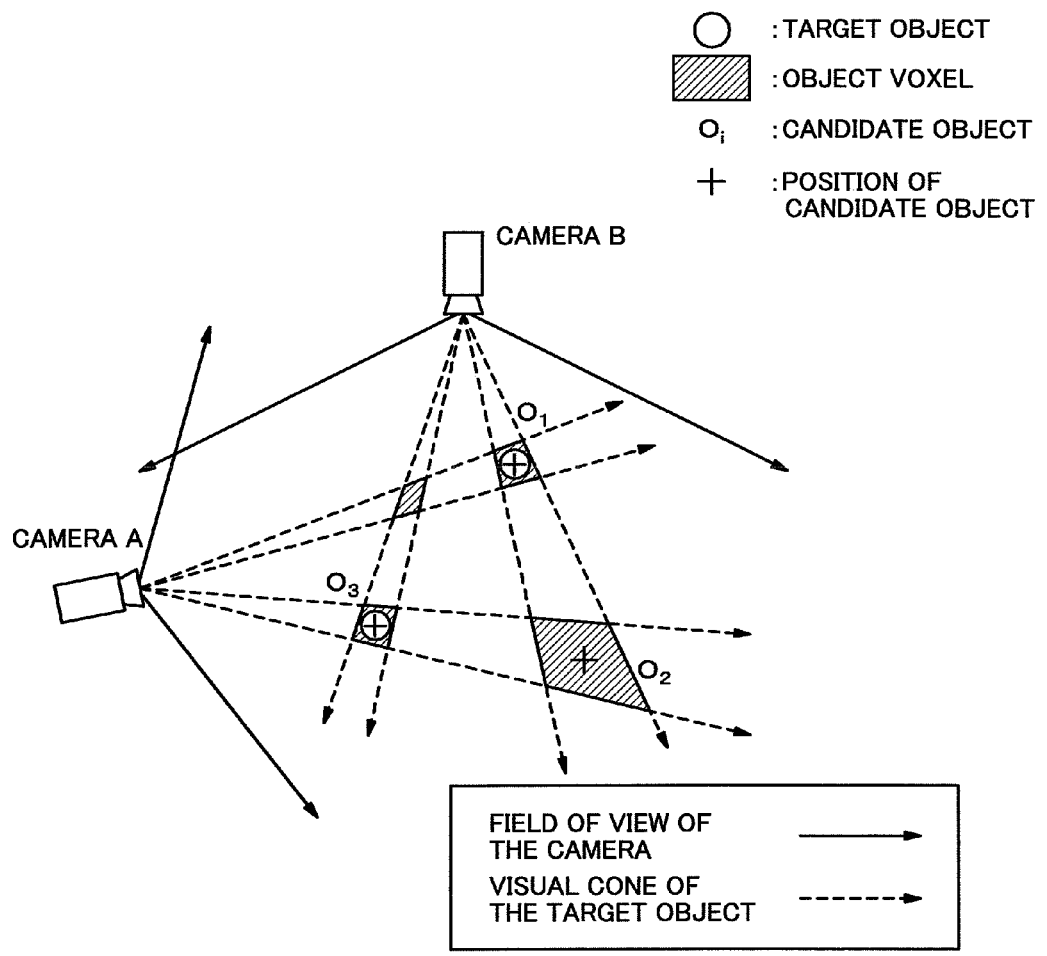
FIG. 4 is a figure showing an example of acquisition of a candidate object using the visual cone intersection method according to the first embodiment.
Figure 5:
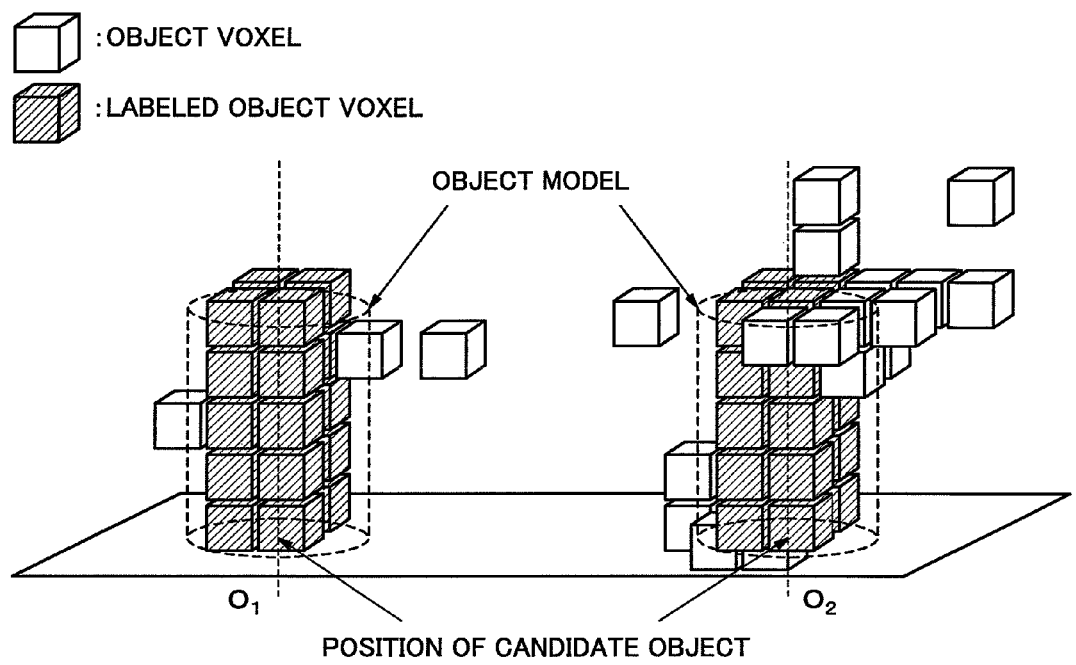
FIG. 5 is a figure showing an example of a labeled object voxel using an object model according to the first embodiment.

FIG. 5 shows an example where the candidate object acquisition unit 31 estimates an object position by the visual cone intersection as shown in FIG. 4 and acquires the candidate object $O_1$ and $O_2$. Even though the object voxels are created by the candidate object acquisition unit 31, there is a possibility the object voxels are excluded at following threshold processing by the candidate object acquisition unit 31 and the created object voxels may not be the candidate object.

The camera parameters indicated in the above description means parameters which correlate two dimensional coordinates on a screen with three dimensional coordinates on real space. That is, the camera parameters indicate a conversion parameter between the two dimensional coordinates and the three dimensional coordinates, position expressed in the three dimensional coordinates of the image acquisition unit, and a direction in a three dimensional space or a two dimensional plane of the image acquisition unit. The image of the two dimensional coordinates acquired by the image acquisition unit and the three dimensional coordinates of the real space can be converted mutually by the conversion process of the candidate object acquisition unit 31 using the camera parameters corresponding to each image acquisition unit.

The overlapping state determination unit 32 acquires information on the overlap among the candidate objects. At first, the overlapping state determination unit 32 executes labeling of the object voxels as the candidate object.

As shown in FIG. 5, the overlapping state determination unit 32 arranges the three-dimensional model (i.e. object model) which shows a shape of the target object at position of the candidate object $O_i$, and executes labeling of the object voxels included in the model as the object voxels of the candidate object $O_i$. The overlapping state determination unit 32 does not use (or it removes) those object voxels which do not belong to any candidate objects.

As an example of an object model, the overlapping state determination unit 32 uses a cylindrical model in the case that a target object is a pedestrian. In the above descriptions, even though an example that the overlapping state determination unit 32 executes labeling of object voxel using the object model is described, any method can be used if the overlapping state determination unit 32 can execute labeling of the object voxels under an assumption that the target object exists in the position of the candidate object.

Next, the overlapping state determination unit 32 acquires the information on the overlap among the candidate objects for each candidate object $O_i$, at the visual cone created by the c-th image acquisition unit. At first, the overlapping state determination unit 32 checks a presence of field of view (i.e. whether it can keep or not a clear field of view) of the camera for the object voxels which are executed a labeling as the candidate object $O_i$ in the projecting direction from the c-th image acquisition unit. In this case, when obstacles exist in the field of view of the camera, the overlapping state determination unit 32 examines whether there are areas which are not obstructed by the obstacles. Then, in the case that clear field of view of the camera is available; the overlapping state determination unit 32 examines whether there is an overlap between an object voxel of the candidate object other than the candidate object $O_i$ and each candidate object $O_j$, to the whole projecting direction. In the case that there is an overlap, then the overlapping state determination unit 32 extracts all the candidate objects of the object voxel which are in the overlapping state.

Figure 6:
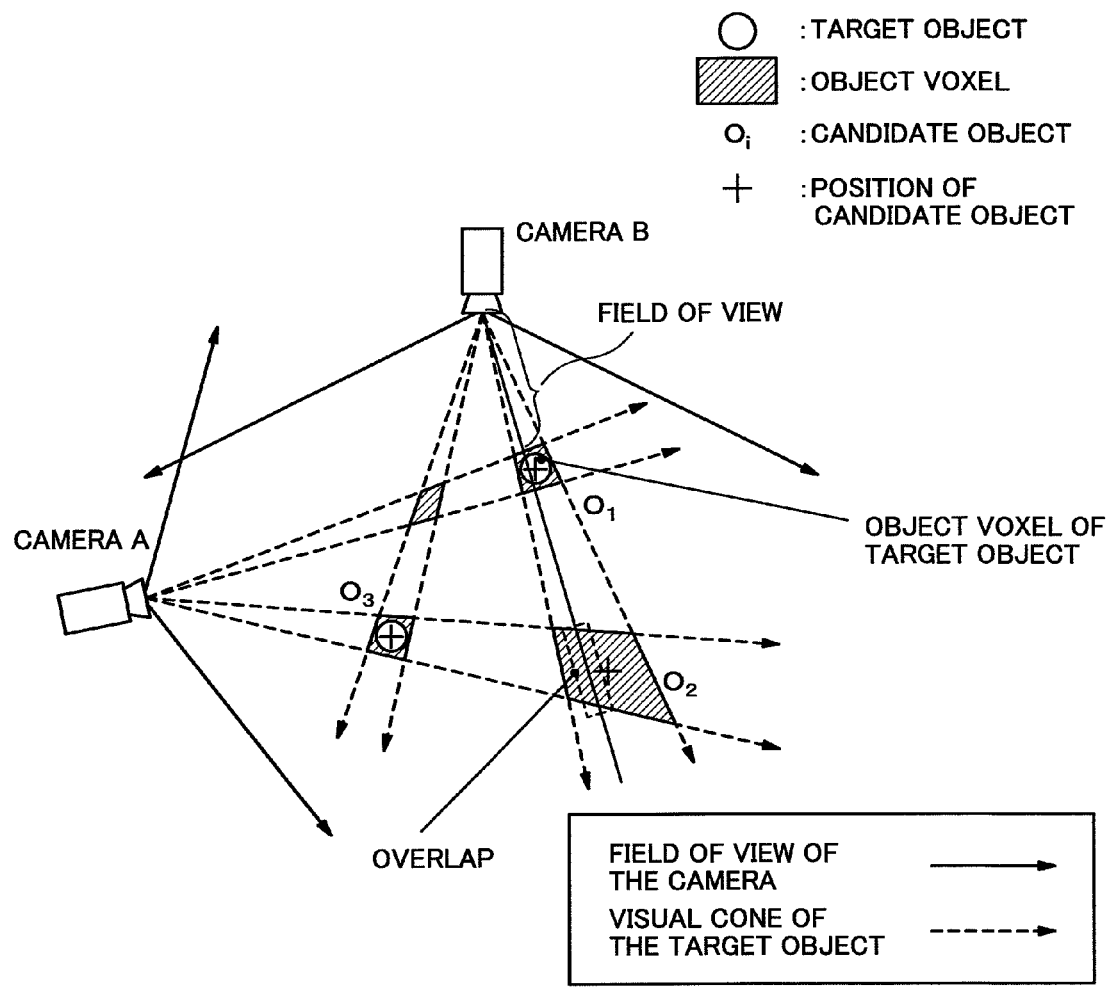
FIG. 6 is a figure showing the acquisition of the information on overlap of each object voxel according to the first embodiment.

FIG. 6 shows an example of the above-mentioned operations. Where, the object voxels of the target object is under the following conditions:

Presence of the field of view: clear
Presence of the overlap: overlapping
Candidate object of the object voxel in the overlapping state: $O_2$ The overlapping state determination unit 32 performs the stated operations to entire object voxels which will be labeled as the candidate object $O_i$, and the overlapping state determination unit 32 determines the overlapping state using the formula (1):

$$\frac{E_{i,c}}{F_{i,c}} \geq th_1 \qquad (1)$$

Where, $F_{i,c}$ is number of object voxels which have clear field of view from the c-th image acquisition unit among the candidate objects $O_i$, $E_{i,c}$ is number of object voxels which are under overlapping state for the projecting direction from the c-th image acquisition unit among the candidate objects $O_i$ and $th_1$ is a threshold value.

When the condition of the formula (1) is satisfied, the overlapping state determination unit 32 judges that the overlap among the candidate objects exists on the visual cone created at the c-th image acquisition unit for the candidate object $O_i$. In other words, the overlapping state determination unit 32 determined that a candidate object fully overlap with other candidate objects, under a situation that the whole object voxels of the candidate objects mostly overlap with the object voxels of other candidate objects. By the way, the overlapping state determination unit 32 determines that there are no overlaps (i.e. without the overlaps) when number of object voxels which are overlapped does not satisfy the formula (1).

In addition, in the case that $F_{i,c}=0$ (i.e. there are no field of views for the c-th image acquisition unit), the overlapping state determination unit 32 determines that there are no field of views for the c-th image acquisition unit. Moreover, the overlapping state determination unit 32 extracts all the candidate objects having the object voxels which are in the overlapping state as the candidate objects in the overlapping state, in the case that the overlapping state determination unit 32 determines that there are overlaps (i.e. they are overlapped). The overlapping state determination unit 32 stores all information concerning determination of these overlapping states in the candidate object information storage unit 41.

The overlapping state determination unit 32 performs these operations for all the candidate objects $O_i$ and for all the image acquisition units (i.e. c-th image acquisition unit). In addition, a rule of counting number of object voxels of $E_{i,c}$ and $F_{i,c}$ by the overlapping state determination unit 32 may includes a counting method wherein number of object voxels which are in the same projecting direction are counted to one.

The degree of confidence acquisition unit 33 acquires the degree of confidence for information on the object voxel which is acquired by the visual cone intersection method and is required for decision that the candidate object Oi is an existing object. The candidate object $O_i$ is determined by the candidate object acquisition unit 31 based on the visual cone intersection method. In the case that all the visual cones of image acquisition units overlap with other candidate objects, there is a possibility that the candidate object is a ghost image object. Therefore, the degree of confidence of the information is decreased. In addition, in the case that number of overlap with other candidate objects may increase, the degree of confidence is much more decreased.

Accordingly, the embodiment defined the degree of confidence as a value. By utilizing the value, the degree of confidence acquisition unit 33 identifies whether the candidate object $O_i$ is either an object or a non-object (i.e. ghost image object). The degree of confidence acquisition unit 33 acquires the degree of confidence $R_i$ using the formula (2):

$$R_i = \begin{cases} \dfrac{\alpha}{L_i} & \dots \quad S_i = L_i \\ 1 & \dots \quad \text{otherwise} \end{cases} \qquad (2)$$

Here, $S_i$ is number of visual cones per each image acquisition unit which is determined to be clear field of view for the candidate object $O_i$, and is a value no more than total number of visual cones per each image acquisition unit. $L_i$ is number of visual cones per each image acquisition unit which is determined to be overlapped for candidate object $O_i$. $\alpha$ is a coefficient and takes a value between 1 to 2. The degree of confidence $R_i$ will indicate a value between 0 and 1.

The formula (2) indicates that the degree of confidence is decreased in accordance with number of overlap becomes larger, in the case that the overlap occurs on all the visual cones of each image acquisition unit which has clear field of view for the candidate object $O_i$ (i.e. $S_i=L_i$). In addition, because the case in that there are at least one image acquisition units which are not overlapped indicates that there is no possibility of existence of the ghost image object, the degree of confidence acquisition unit 33 judges that the degree of confidence concerning the information on the visual cone intersection is to be high ($R_i=1$). The degree of confidence acquisition unit 33 extracts $S_i$ and $L_i$ which are used in the calculation of the formula (2) from the candidate object information storage unit 41.

The degree of confidence $R_i$ can be expressed as shown in a formula (3) considering an overlap situation among the candidate objects. The degree of confidence acquisition unit 33 executes calculation of $\Sigma$ and selection of "min" in the formula (3) for an image acquisition unit (i.e. c-th image acquisition unit) which is determined to have clear field of view.

$$R_i = \begin{cases} \dfrac{\alpha}{\sum \dfrac{E_{i,c}}{F_{i,c}}} & \dots \quad S_i = L_i \\ 1 - \min\left(\dfrac{E_{i,c}}{F_{i,c}}\right) & \dots \quad \text{otherwise} \end{cases} \qquad (3)$$

The degree of co-movement acquisition unit 34 acquires a degree of co-movement which shows how many number of other candidate objects co-move in accordance with the movement of the candidate object $O_i$. Because the ghost image objects are formed in accordance with the visual cone of the actual objects, it certainly co-moves with the actual objects. On the other hand, an actual object seldom co-moves fully with other objects and actual objects co-move more seldom as number of the actual objects increase.

Accordingly, a value of a degree of co-movement is defined in the embodiment. The degree of co-movement acquisition unit 34 identifies the candidate object $O_i$ as either an object or a non-object (i.e. ghost image object) using the value. The degree of co-movement acquisition unit 34 acquires the degree of co-movement $G_i$ using a formula (4):

$$G_i = 1 - \frac{\beta}{K_i + 1} \qquad (4)$$

Here, $K_i$ is number of visual cones (i.e. number of visual cones whose unit is based upon number of image acquisition unit) including other candidate objects which co-move with a movement of the candidate object $O_i$, and is the value of no more than total number of visual cone per each image acquisition unit (specifically, it will be no more than the above stated $L_i$). Detailed method of $K_i$ calculation will be described later. $\beta$ is the coefficient and takes a value between 0 and 1. Therefore, the degree of co-movement $G_i$ will take the value between 0 and 1.

The formula (4) indicates that the degree of co-movement $G_i$ becomes larger as number of other candidate objects which co-move with the movement of the candidate object $O_i$ becomes larger.

Specifically, $K_i$ can be calculated as follows. The degree of co-movement acquisition unit 34 uses information stored in the candidate object information storage unit 41 as information required for calculating $K_i$. At first, the degree of co-movement acquisition unit 34 extracts another candidate object (it may be multiple candidate objects) which is determined to be in the overlapping state with the candidate object $O_i$ in a field of view of the c-th image acquisition unit. Then, the degree of co-movement acquisition unit 34 extracts the information on the preceding candidate object $O_i$ (A*) which is captured at the preceding time and is located at a nearest position to the current candidate object $O_i$. In addition, the degree of co-movement acquisition unit 34 also extracts those information on the preceding candidate object (B*) which is located at a nearest position to that, for another candidate object (i.e. at present) which is acquired in the above process and is in the overlapping state (it may be multiple candidate objects).

Figure 7:
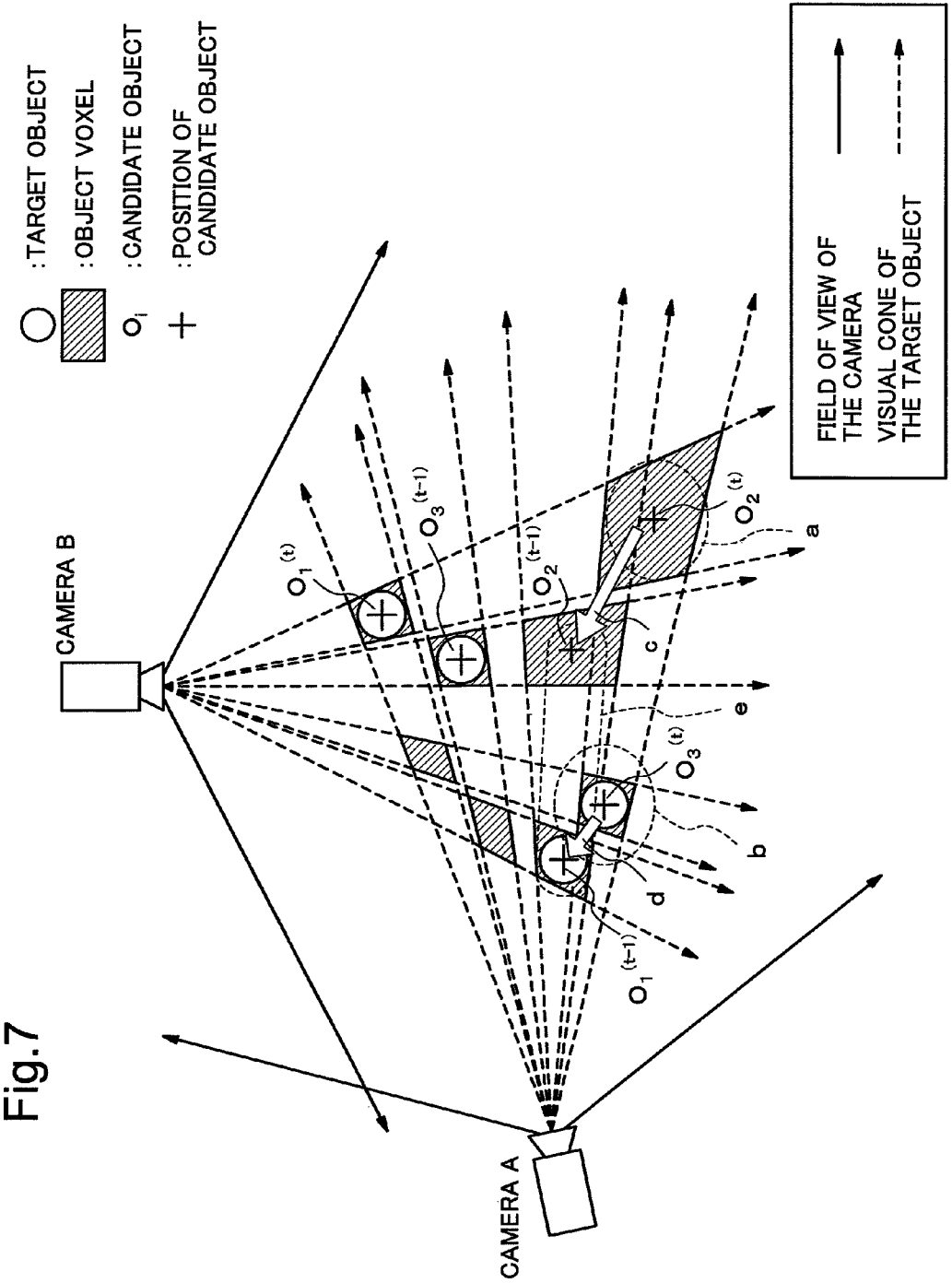
FIG. 7 is a figure showing a process image of calculating $K_i$ which is required for acquisition of a degree of co-movement $G_i$ according to the first embodiment.

The degree of co-movement acquisition unit 34 increases a count $K_i$ by one in the case that there is at least one information which coincident with the information on the preceding candidate object extracted as B*, among the information which is concerning on other candidate objects which are in a overlapped state of the c-th image acquisition unit for the preceding candidate object $O_i$ which is indicated as A* abovementioned. This process is performed to all image acquisition units to acquire $K_i$. FIG. 7 shows, how to count the degree of continuity, as an example of the process of co-movement acquisition unit 34. These processes are done in sequential order of from "a" to "e". In the figure, t and t−1 are defined as follows:

t: current
t−1: preceding time

Process a: The degree of co-movement acquisition unit 34 selects $O_2^{(t)}$ (i.e. one which is indicated by a cross in a nearest dotted line circle of "a" in FIG. 7) as a candidate object.

Process b: The degree of co-movement acquisition unit 34 extracts $O_3^{(t)}$ (i.e. one which is indicated by a circle which surrounds a cross in a nearest dotted line circle of "b" in FIG. 7) as another candidate object which is in the overlapping state of camera A for $O_2^{(t)}$. Note that, although another candidate object which is under the overlapping state also exists in the field of view of the camera B, FIG. 7 shows only the field of view of the camera A as an example.

Process c: Suppose that current candidate object is $O_2^{(t)}$, the degree of co-movement acquisition units 34 extracts a candidate object $O_2^{(t-1)}$ (i.e. one which is indicated by a cross ahead of block arrow c in FIG. 7) which is locating ahead of a block arrow from $O_2^{(t)}$ as the preceding candidate object which is located at a nearest position.

Process d: Suppose that another candidate object (current candidate object) in the acquired overlapping state is $O_3^{(t)}$, the degree of co-movement acquisition unit 34 extracts $O_1^{(t-1)}$ (i.e. one which is indicated by a circle which surrounds a cross ahead of a block arrow d in FIG. 7) which is locating ahead of the block arrow from $O_3^{(t)}$ as the preceding candidate object which is located at a nearest position.

Process e: Suppose that preceding candidate object is $O_2^{(t-1)}$ the degree of co-movement acquisition units 34 checks whether at least one preceding candidate object $O_1^{(t-1)}$ may exist among other candidate objects (i.e. one indicated in dotted oval line e in FIG. 7) which are in the overlapping state with $O_2^{(t-1)}$ from the camera A. In the case of FIG. 7, $K_i$ will be counted, because $O_1^{(t-1)}$ exists, as it has described in the above.

The object candidate determination unit 35 calculates the posteriori probability of object or non-object of the candidate object $O_i$ following to the formula (5) using the degree of confidence $R_i$ acquired from the degree of confidence acquisition unit 33 and the degree of co-movement $G_i$ acquired from the degree of co-movement acquisition unit 34. Then, the object candidate determination unit 35 discriminates the candidate object $O_i$ whether it is object or non-object, and outputs the position of the candidate object $O_i$ which is determined as an object. Because the object candidate determination unit 35 does not output position of the candidate object $O_i$ which is judged to be a non-object (i.e. ghost image object), it can reduce incorrect estimation of object positions.

$$P(\omega_i \mid R_i, G_i) = \frac{p(R_i, G_i \mid \omega_i)P(\omega_i)}{p(R_i, G_i)} \quad (5)$$
$$= \frac{p(R_i \mid \omega_i)p(G_i \mid \omega_i)P(\omega_i)}{\sum_{\omega_j=0}^{1}[p(R_i \mid \omega_j)p(G_i \mid \omega_j)P(\omega_j)]}$$

Here, $\omega_i$ has two state: 0 and 1, wherein $\omega_i=1$ indicates an object, and $\omega_i=0$ indicates a non-object. In addition, the priori probability $P(\omega_i)$ can be set to 0.5, or it may be set appropriately based on user's knowledge. In addition, in the case of $\omega_i=1$, as the probability density function $P(R_i \mid \omega_i)$ for the degree of confidence $R_i$, the object candidate determination unit 35 selects a function so that the probability density becomes higher (a possibility of being object becomes higher) in accordance with degree of confidence $R_i$ becomes higher and the probability density becomes lower in accordance with degree of confidence $R_i$ becomes lower.

In addition, in the case of $\omega_i=0$, the object candidate determination unit 35 selects a reverse function. As a probability density function $P(G_i \mid \omega_i)$ for the degree of co-movement $G_i$, in the case of $\omega_i=1$, the object candidate determination unit 35 selects a function so that the probability density becomes higher (a possibility of being object becomes higher) in accordance with degree of co-movement $G_i$ becomes lower and the probability density becomes lower in accordance with the probability density becomes higher. The object candidate determination unit 35 sets the integral value of the probability density function to 1.

Figure 19:
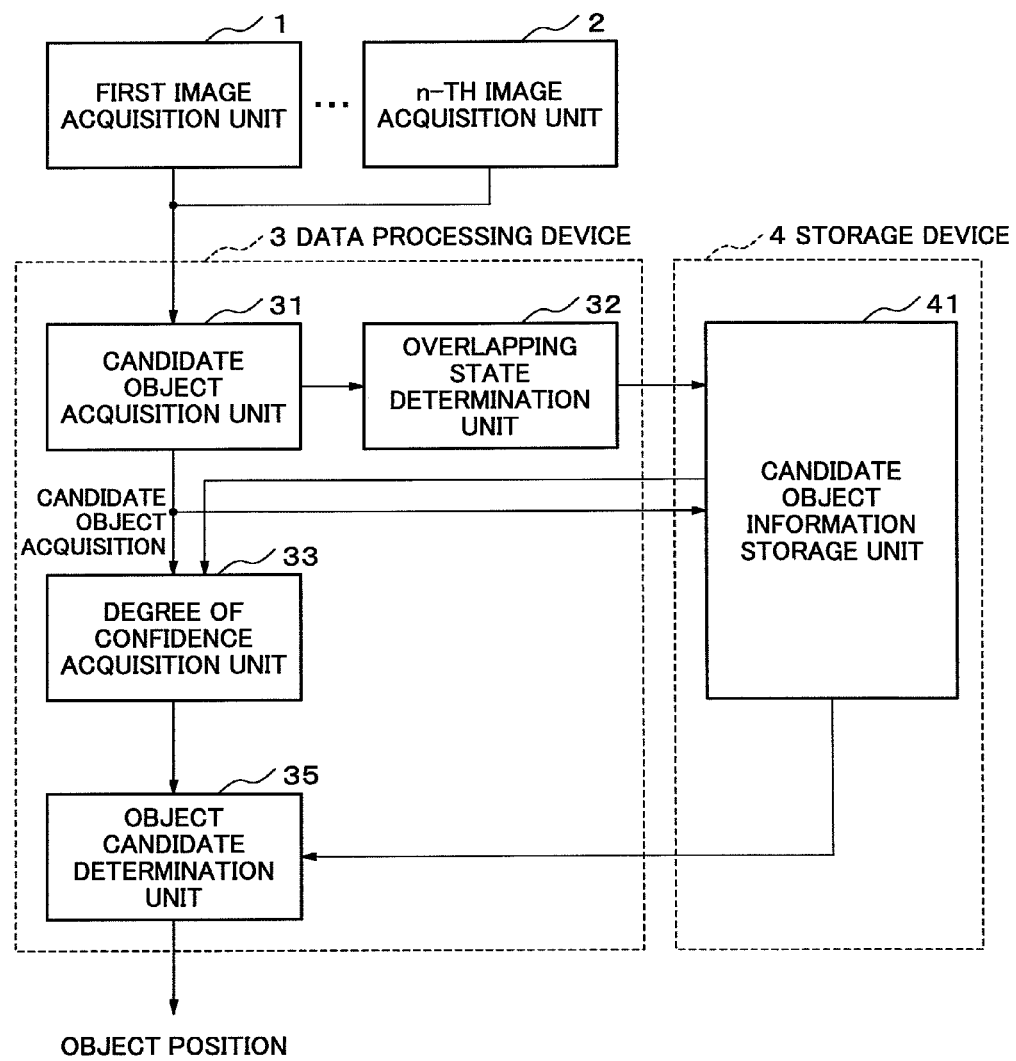
FIG. 19 is a block diagram showing another configuration according to the first embodiment of the present invention.
Figure 20:
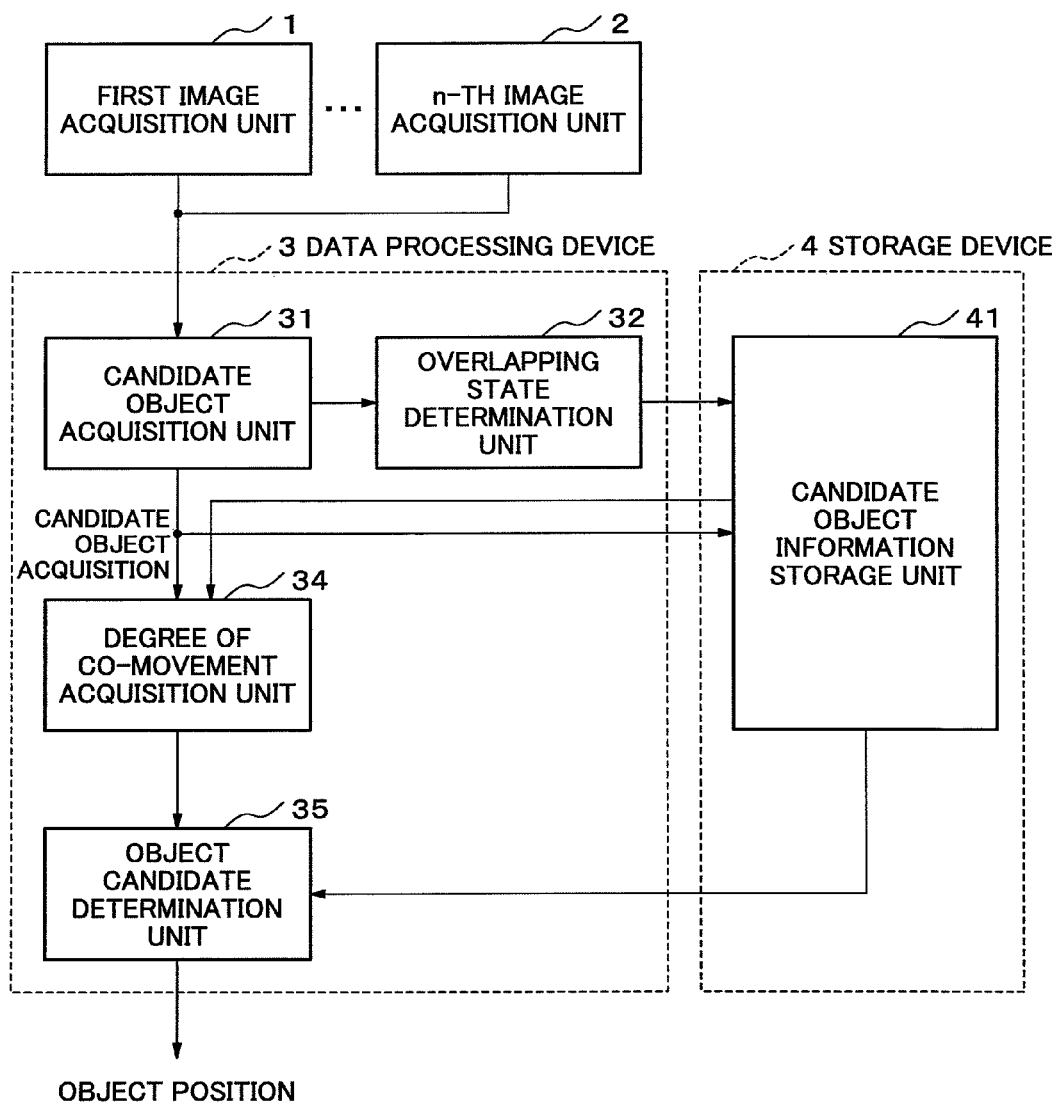
FIG. 20 is a block diagram showing another configuration according to the first embodiment of the present invention.

Here, although it defined the probability density function as mentioned above, the object candidate determination unit 35 may estimate by learning the probability density function. In addition, although the object candidate determination unit 35 acquired the posteriori probability of either an object or a non-object of the candidate object $O_i$ using both the degree of confidence $R_i$ acquired from the degree of confidence acquisition unit 33 and the degree of co-movement $G_i$ acquired from the degree of co-movement acquisition unit 34 as is described above, the object candidate determination unit 35 may acquire the posteriori probability using one of them. In this case, the object candidate determination unit 35 acquires the posteriori probability of either objects or non-objects using the following formula (5-1) or formula (5-2). In addition, in this case, entire embodiment takes the configuration as shown in FIG. 19 (only the case for the degree of confidence) or in FIG. 20 (only the case for the degree of co-movement).

$$P(\omega_i \mid R_i) = \frac{p(R_i \mid \omega_i)P(\omega_i)}{p(R_i)} \quad (5\text{-}1)$$
$$= \frac{p(R_i \mid \omega_i)P(\omega_i)}{\sum_{\omega_j=0}^{1}[p(R_i \mid \omega_j)P(\omega_j)]}$$

$$P(\omega_i \mid G_i) = \frac{p(G_i \mid \omega_i)P(\omega_i)}{p(G_i)} \quad (5\text{-}2)$$
$$= \frac{p(G_i \mid \omega_i)P(\omega_i)}{\sum_{\omega_j=0}^{1}[p(G_i \mid \omega_j)P(\omega_j)]}$$

Next, it will describe the operations of the first embodiment in detail with reference to FIG. 2, FIG. 8, FIG. 9, FIG. 10, FIG. 11, FIG. 12, FIG. 13 and FIG. 14.

Figure 8:
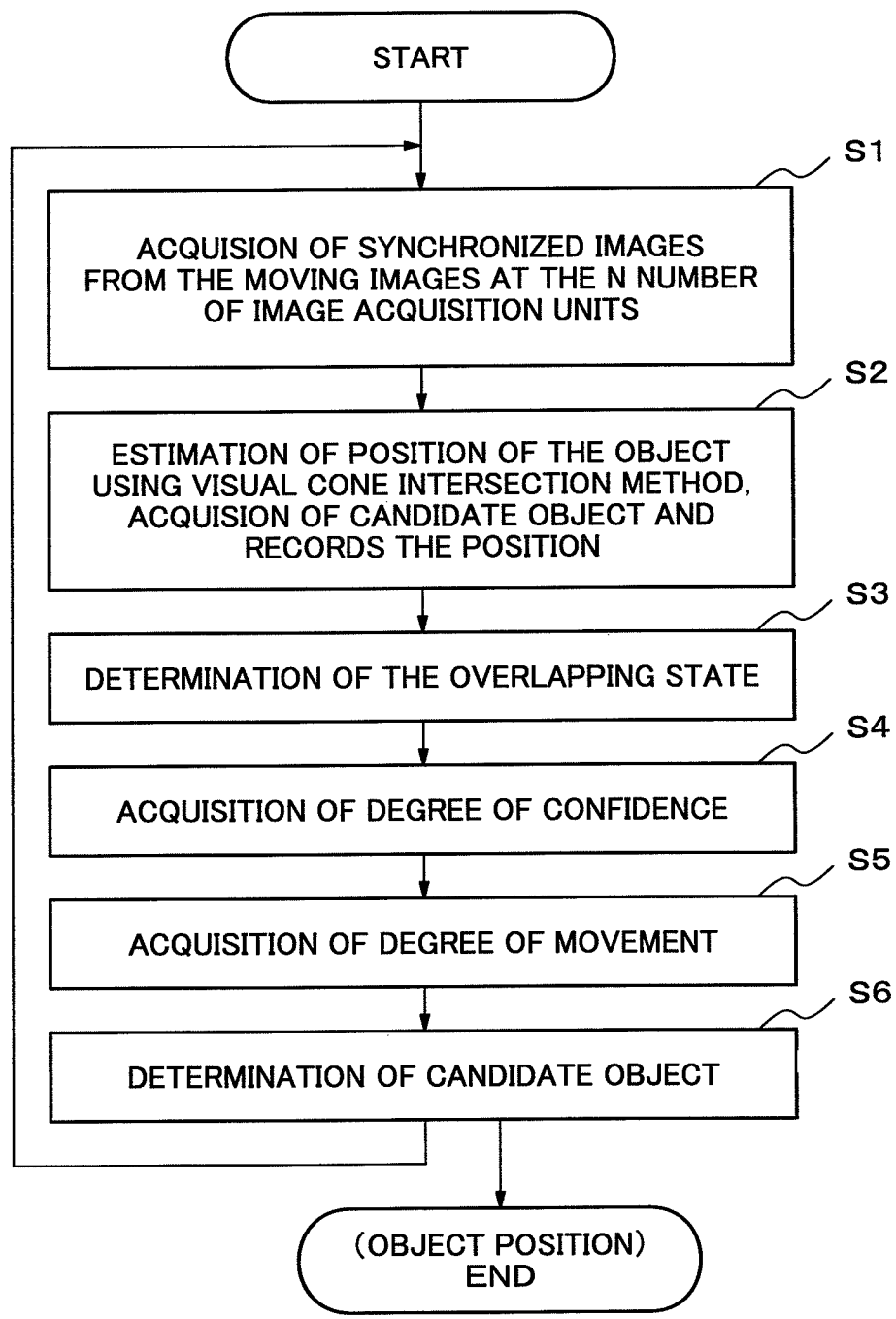
FIG. 8 is a flowchart showing operations according to the first embodiment of the present invention.

FIG. 8 is a flowchart showing the operations according to the first embodiment. The first image acquisition unit 1 to n-th image acquisition unit 2 acquires images from moving images of digital cameras or video cameras or the like. Then, the candidate object acquisition unit 31 acquires the image captured by each image acquisition unit after synchronizing capturing timing among n number of image acquisition units (Step S1). Then, the candidate object acquisition unit 31 executes an image processing such as background subtraction, acquires an image which indicates an object area and acquires object voxels by the visual cone intersection method on each image. Further, the candidate object acquisition unit 31 votes number of object voxels for each position on the plane, estimates position of the object after a threshold processing, a labeling and a centroid computation or the like, and stores the estimation value in the candidate object information storage unit 41 as the position of the candidate position (Step S2).

The overlapping state determination unit 32 acquires the information on the overlap between the candidate objects for the candidate object $O_i$ in the visual cone which the c-th image acquisition unit created (Step S3).

Figure 9:
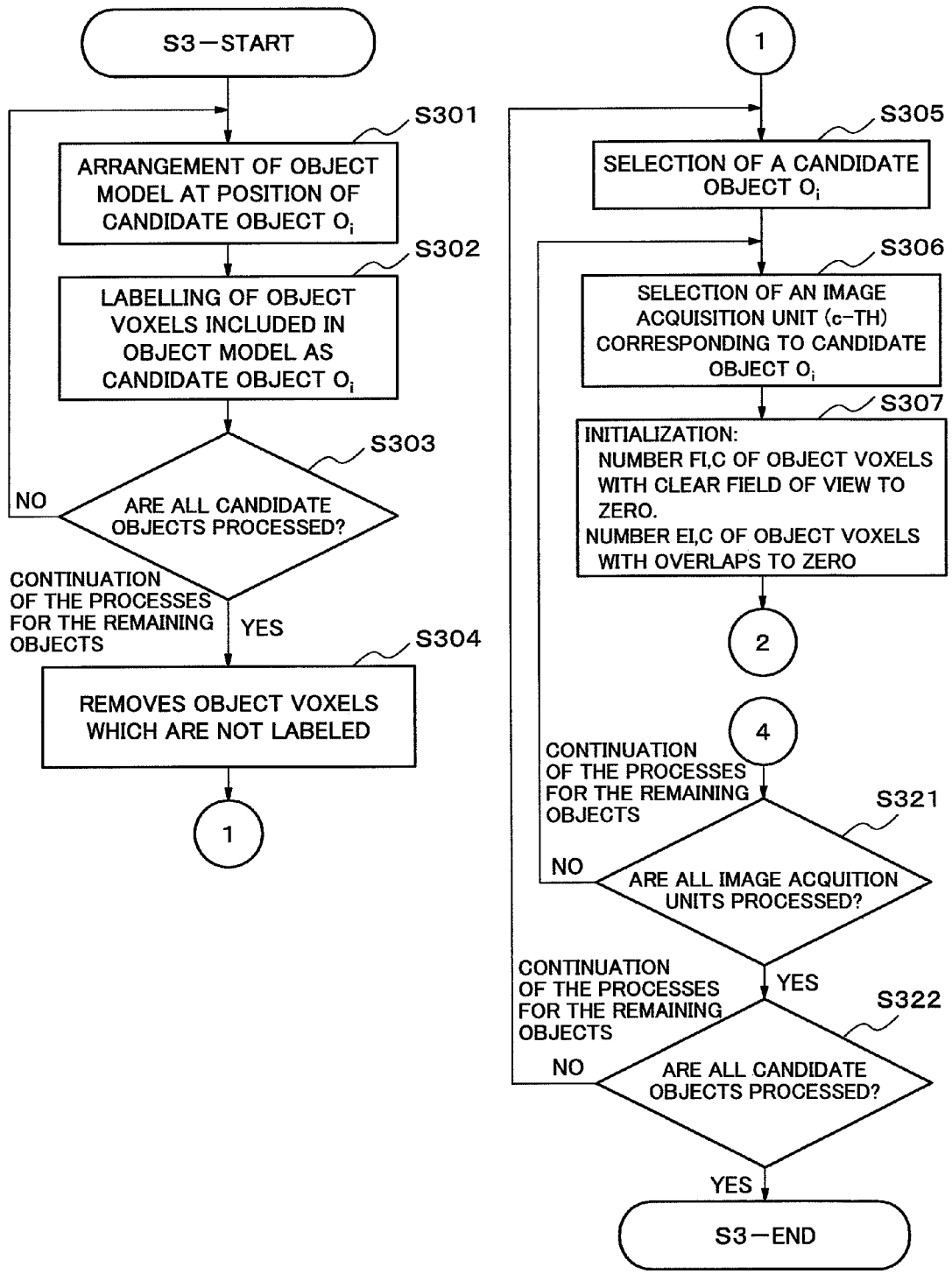
FIG. 9 is a flowchart showing operations according to the first embodiment of the present invention.

Here, Step S3 will be further described in detail according to the flowchart shown in FIG. 9. The overlapping state determination unit 32 arranges object model which indicates a shape of the target object at the position of the candidate object $O_i$ (Step S301), and executes labeling of the object voxels included in this object model as the object voxels for the candidate object $O_i$ (Step S302).

In the case that the overlapping state determination unit 32 has completed the process of Step S302, overlapping state determination unit 32 checks whether the processes Step S301 to Step S302 have been completed for all the candidate objects $O_i$ (Step 303), and repeats the processes Step S301 to Step S302 until the process will be completed when the processes have not been completed for all the candidate objects $O_i$ (NO in Step S303).

In the case that the overlapping state determination unit 32 has completed processes for all the candidate objects $O_i$ (YES in Step S303), then it removes the object voxels which are not labeled (Step S304).

Next, the overlapping state determination unit 32 selects a candidate object $O_i$ as a processing object (Step S305), and selects the c-th image acquisition unit which is corresponding to the candidate object $O_i$ as the processing object (Step S306). Then, the overlapping state determination unit 32 initializes both a number $F_{i,c}$ of the object voxels of the candidate object $O_i$ which has clear field of view from the c-th image acquisition unit and a number $E_{i,c}$ of the object voxel of the candidate object $O_i$ which has overlap in a projecting direction from the c-th image acquisition unit to zero count (Step S307).

Next, from number 2 enclosed within a circle to number 4 enclosed within a circle in FIG. 9 will be described according to the flowchart shown in FIG. 10 and FIG. 11. The overlapping state determination unit 32 selects an object voxel as the processing object which is to be labeled among the candidate objects $O_i$ (Step S308) and investigates whether field of view from the camera in the projecting direction of the c-th image acquisition unit is available or not for the object voxel which is executed labeling among the candidate objects $O_i$ (Step S309). In this case, when an obstacle exists in the field of view of the camera, the overlapping state determination unit 32 examines whether there is an area which is not interrupted by the obstacle.

Figure 10:
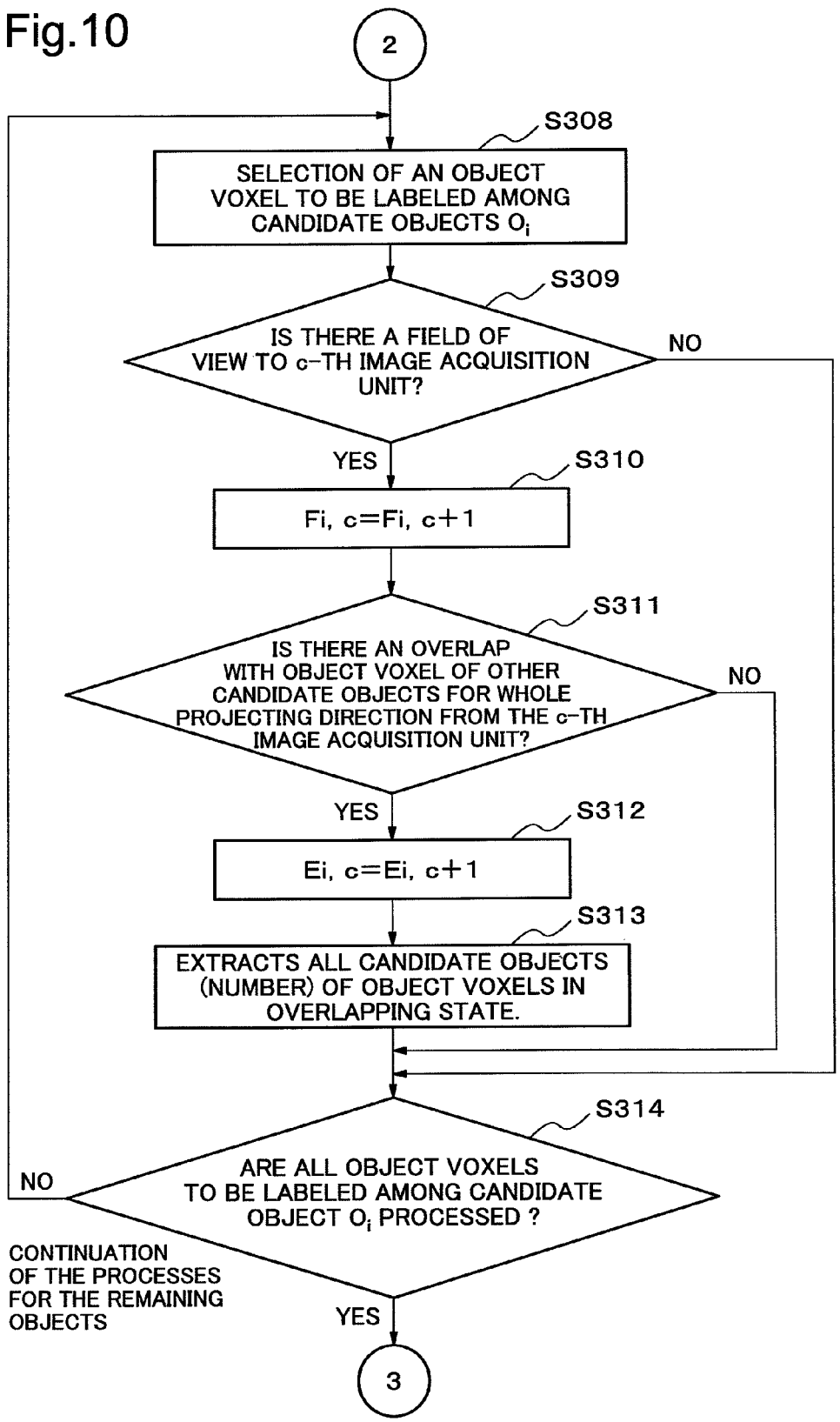
FIG. 10 is a flowchart showing operations according to the first embodiment of the present invention.

In the case that there is a clear field of view (YES in Step S309, FIG. 10), the overlapping state determination unit 32 increases number $F_{i,c}$ (i.e. $F_{i,c}=F_{i,c}+1$) (Step S3, FIG. 10), and investigates whether there is an overlap with the object voxel of other candidate objects for all the projecting direction from the c-th image acquisition unit (Step S311, FIG. 10). In the case that there is an overlap (YES in Step 311, FIG. 10), the overlapping state determination unit 32 increases number $E_{i,c}$ ($E_{i,c}=E_{i,c}+1$) (Step S312, FIG. 10), and extracts all the candidate objects (number i) of the object voxel in the overlapping state (Step S313, FIG. 10).

In the case that there is no field of view (NO in Step S309, FIG. 10), or the case that there is no overlap (No in Step S311, FIG. 10), and or the case that the process of Step S313 (FIG. 10) has completed, the overlapping state determination unit 32 checks whether the processes of Step S308 to Step S313 (FIG. 10) have been executed for all object voxels to be labeled among the candidate objects $O_i$ (Step S314, FIG. 10).

In the case that the processes have not been completed for all object voxels to be labeled among the candidate objects $O_i$ (NO in Step S314, FIG. 10), then the overlapping state determination unit 32 repeats the processes of Step S308 to Step S314 (FIG. 10) until the processes will be completed. In the case that the processes have been completed for all object voxels to be labeled among the candidate objects $O_i$ (YES in Step S314, FIG. 10), then the overlapping state determination unit 32 determines whether $F_{i,c}=0$ or not (Step S315, FIG. 11). In the case that $F_{i,c}=0$, (YES in Step S315, FIG. 11), then the overlapping state determination unit 32 determines that the candidate object $O_i$ is in a state of lacking field of view from the c-th image acquisition unit, and stores the information on the candidate object information storage unit 41 (Step S316, FIG. 11).

Figure 11:
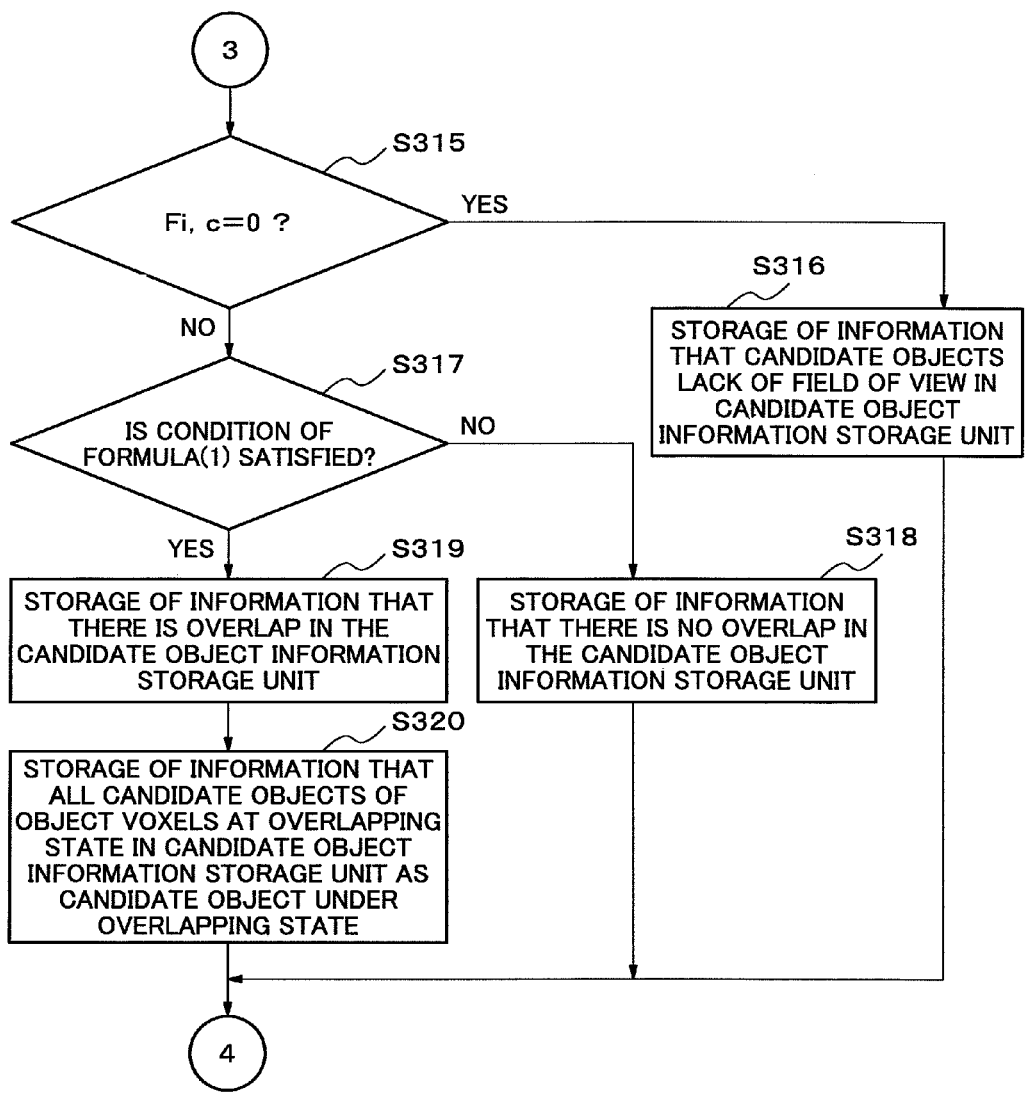
FIG. 11 is a flowchart showing operations according to the first embodiment of the present invention.

In the case that $F_{i,c}=0$ is not satisfied (NO in Step S315, FIG. 11), then the overlapping state determination unit 32 determines whether it satisfies the condition of the formula (1) (Step S317, FIG. 11) and stores to the candidate object information storage unit 41 (Step S318, FIG. 11) information based on the determination, that there is no overlap of the candidate object $O_i$ in the projecting direction of the c-th image acquisition unit, when the formula (1) is not satisfied (NO in Step S317, FIG. 11).

In the case that formula (1) is satisfied (YES in Step S317, FIG. 11), then the overlapping state determination unit 32 decides that there is an overlap of the candidate object $O_i$ in the projecting direction of the c-th image acquisition unit, and stores the information to the candidate object information storage unit 41 (Step S319, FIG. 11). In addition, the overlapping state determination unit 32 stores all the candidate objects of the object voxels at the overlapping state in the candidate object information storage unit 41 as the candidate object under the overlapping state (Step S320, FIG. 11).

If the processes of Step S316, Step S318 or Step S320 have been completed, the overlapping state determination unit 32 checks whether the processes Step S306 to Step S320 are executed for all the c-th image acquisition units (Step S321, FIG. 9), and repeats the processes of Step S306 to Step S321 (FIGS. 9, 10 and 11) until the processes will be completed in the case that the processes have not been completed for all the c-th image acquisition units (NO in Step S321, FIG. 9).

In the case that the processes have completed for all the c-th image acquisition units (YES in Step S321, FIG. 9), the overlapping state determination unit 32 checks whether the processes Step S305 to Step S321 (FIGS. 9, 10 and 11) are executed for all the candidate objects $O_i$ (Step S322), and repeats the processes from Step S305 to Step S322 until the processes will be completed in the case that the processes have not completed for all the candidate objects $O_i$ (NO in Step S322).

In the case that the processes for all the candidate objects $O_i$ have been completed (YES in Step S322), the overlapping state determination unit 32 completes the processes of Step S3.

Next, the degree of confidence acquisition unit 33 acquires the degree of confidence which is required for a decision on whether the candidate object $O_i$ is an existing object or not, for the object voxels which is acquired by the visual cone intersection method (Step S4, FIG. 8).

Here, Step S4 will be described further in detail according to the flowchart shown in FIG. 12. The degree of confidence acquisition unit 33 calculates and acquires number of visual cones S, per each image acquisition unit which is determined to have clear field of view from each image acquisition unit for the candidate object $O_i$, using the candidate object information storage unit 41 (Step S401, FIG. 12).

Figure 12:
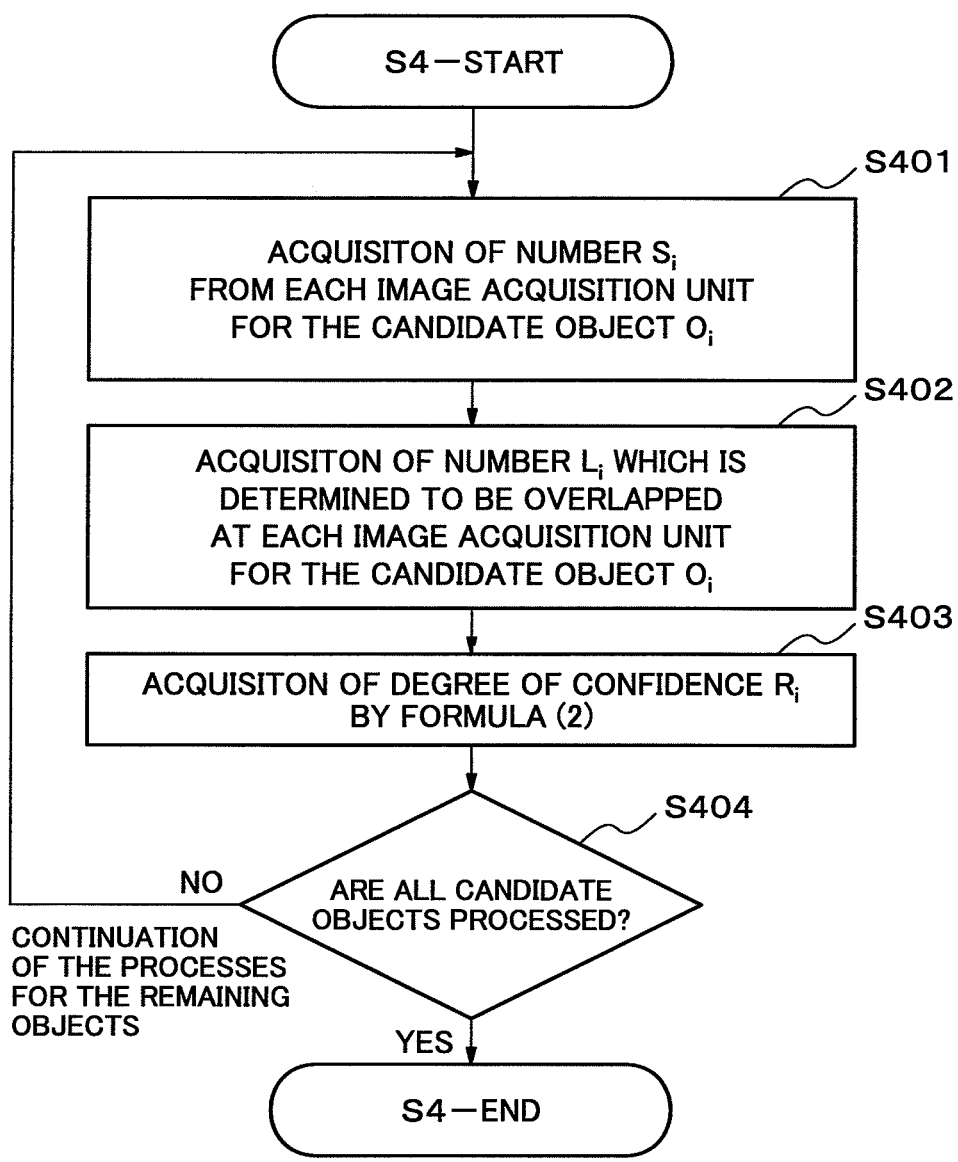
FIG. 12 is a flowchart showing operations according to the first embodiment of the present invention.

Next, the degree of confidence acquisition unit 33 calculates and acquires number of visual cones $L_i$ per each image acquisition unit which is determined to be overlapped at each image acquisition unit for the candidate object $O_i$, using the candidate object information storage unit 41 (Step S402, FIG. 12). Then, the degree of confidence acquisition unit 33 calculates and acquires the degree of confidence $R_i$ by the formula (2), using $S_i$ acquired in Step S401 and $L_i$ acquired in Step S402 (Step S403, FIG. 12).

If the process of Step S403 has been completed, the degree of confidence acquisition unit 33 checks if the processes of Step S401 to Step S403 are executed for all the candidate objects $O_i$ (Step S404, FIG. 12), and repeats the processes of Step S401 to Step S404 until the processes will be completed in the case that the processes have not been completed for all the candidate objects $O_i$ (NO in Step S404, FIG. 12). In the case that the processes have been completed for all the candidate objects $O_i$ (YES in Step S404, FIG. 12), the degree of confidence acquisition unit 33 completes the process of Step S4.

Next, the degree of co-movement acquisition unit 34 acquires the degree of co-movement which shows to what extent other candidate objects co-move in accordance with the movement of the candidate object $O_i$ (Step S5, FIG. 8).

Here, the Step S5 will be described further in detail according to the flowchart shown in FIG. 13. The degree of co-movement acquisition unit 34 selects one among the candidate objects $O_i$ to be processed (Step S501, FIG. 13), and initializes number of visual cones $K_i$ per each image acquisition unit including other candidate objects which co-move in accordance with the movement of the candidate object $O_i$ to zero (Step S502, FIG. 13).

Figure 13:
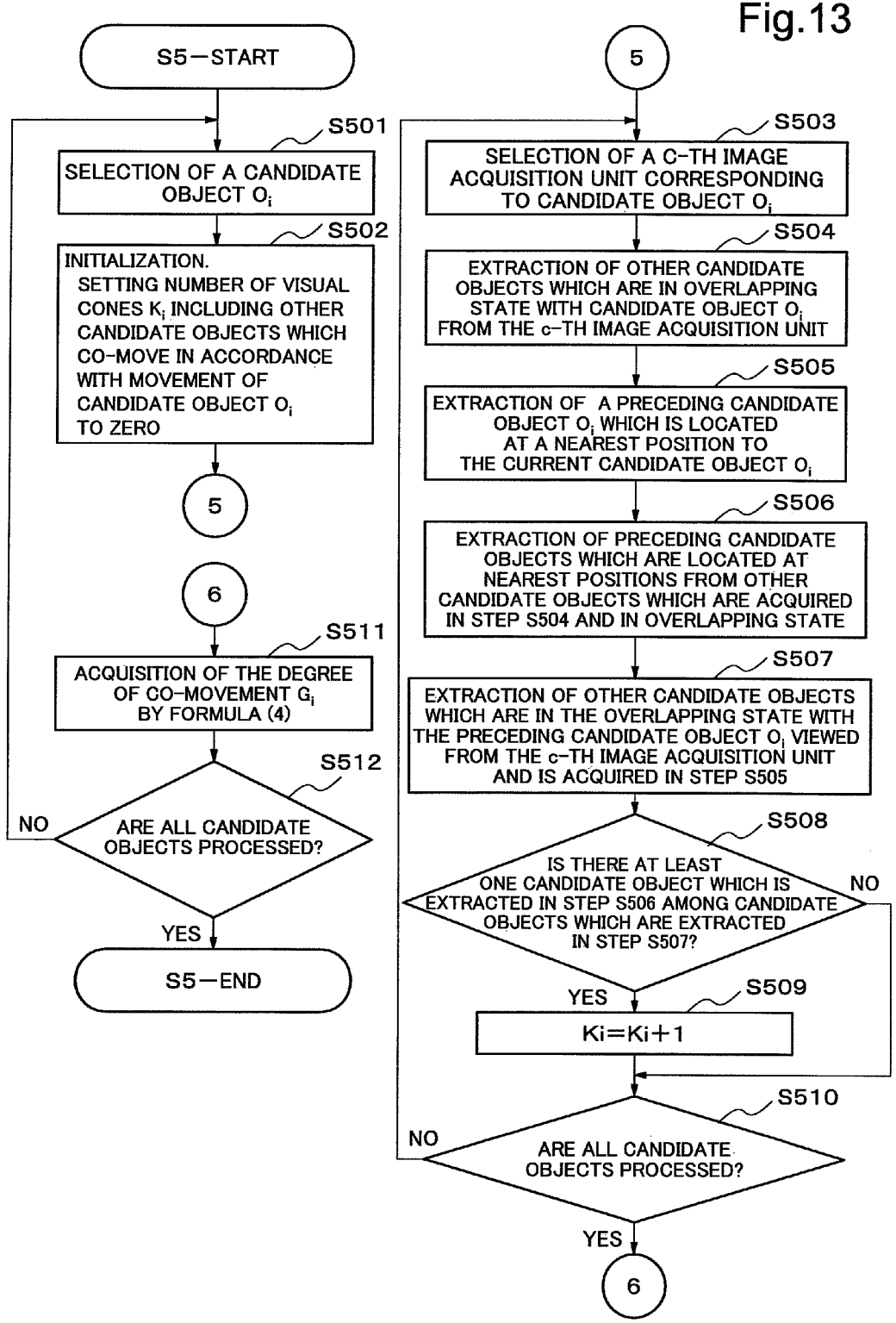
FIG. 13 is a flowchart showing operations according to the first embodiment of the present invention.

Then, the degree of co-movement acquisition unit 34 selects one among the c-th image acquisition units corresponding to the candidate object $O_i$ (Step S503, FIG. 13), and extracts other candidate objects viewed from the c-th image acquisition unit, which are in the overlapping state with the candidate object $O_i$, from the candidate object information storage unit 41 (Step S504, FIG. 13).

Then, the degree of co-movement acquisition unit 34 extracts a preceding candidate object $O_i$ which is located at a nearest position to the current candidate object $O_i$, from the candidate object information storage unit 41 (Step S505, FIG. 13). In addition, the degree of co-movement acquisition unit 34 extracts the information on the preceding candidate object, which is located at a nearest position to other candidate objects (i.e. current candidate object) which is acquired in Step S504 and in an overlapping state, from the candidate object information storage unit 41 (Step S506, FIG. 13). Then, the degree of co-movement acquisition unit 34 extracts other candidate objects acquired in Step S505, which are in the overlapping state with the preceding candidate object $O_i$ viewed from the c-th image acquisition unit (FIG. 13) from the candidate object information storage unit 41 (FIG. 13 and Step S507). Then, the degree of co-movement acquisition unit 34 determines whether at least one candidate object which is extracted in Step S506 (FIG. 13) among the candidate objects which are extracted in Step S507 (Step S508, FIG. 13) exists.

In the case that at least one of them exists (YES in Step S508, FIG. 13), the degree of co-movement acquisition unit 34 increases number of $K_i$ (i.e. $K_i=K_i+1$) (Step S509, FIG. 13). In the case that no one exists (NO in Step S508, FIG. 13) or the process of Step S509 (FIG. 13) has been completed, the degree of co-movement acquisition unit 34 checks whether the processes Step S503 to Step S509 (FIG. 13) have been executed to all the c-th image acquisition units (Step S510, FIG. 13).

In the case that the processes have not been completed for all the c-th image acquisition units (NO in Step S510), the degree of co-movement acquisition unit 34 repeats the processes of Step S503 to Step S510 (FIG. 13) until the processes will be completed. In the case that the processes have been completed for all the c-th image acquisition units (YES in Step S510, FIG. 13), the degree of co-movement acquisition unit 34 calculates and acquires the degree of co-movement $G_i$ by the formula (4) using acquired $K_i$ (Step S511, FIG. 13).

When the process of Step S511 (FIG. 13) has been completed, the degree of co-movement acquisition unit 34 checks whether the processes of Step S501 to Step S511 (FIG. 13) are executed to all the candidate objects $O_i$ (Step S512, FIG. 13). In the case that the processes have not been completed for all the candidate objects $O_i$ (NO in Step S512, FIG. 13), the degree of co-movement acquisition unit 34 repeats the processes of Step S501 to Step S512 (FIG. 13) until the processes will be completed. In the case that the processes have been completed for all the candidate objects $O_i$ (YES in Step S512, FIG. 13), the degree of co-movement acquisition unit 34 completes the process of Step S5 (FIG. 8).

Next, the object candidate determination unit 35 acquires the posteriori probabilities of object or non-object of the candidate object $O_i$, identifies the candidate object $O_i$ as either an object or a non-object and outputs the position of the candidate object $O_i$ which is determined as an object (Step S6, FIG. 8).

Step S6 will be described further in detail according to the flowchart shown in FIG. 14. The object candidate determination unit 35 selects a candidate object $O_i$ among objects to be processed (Step S601, FIG. 14).

Figure 14:
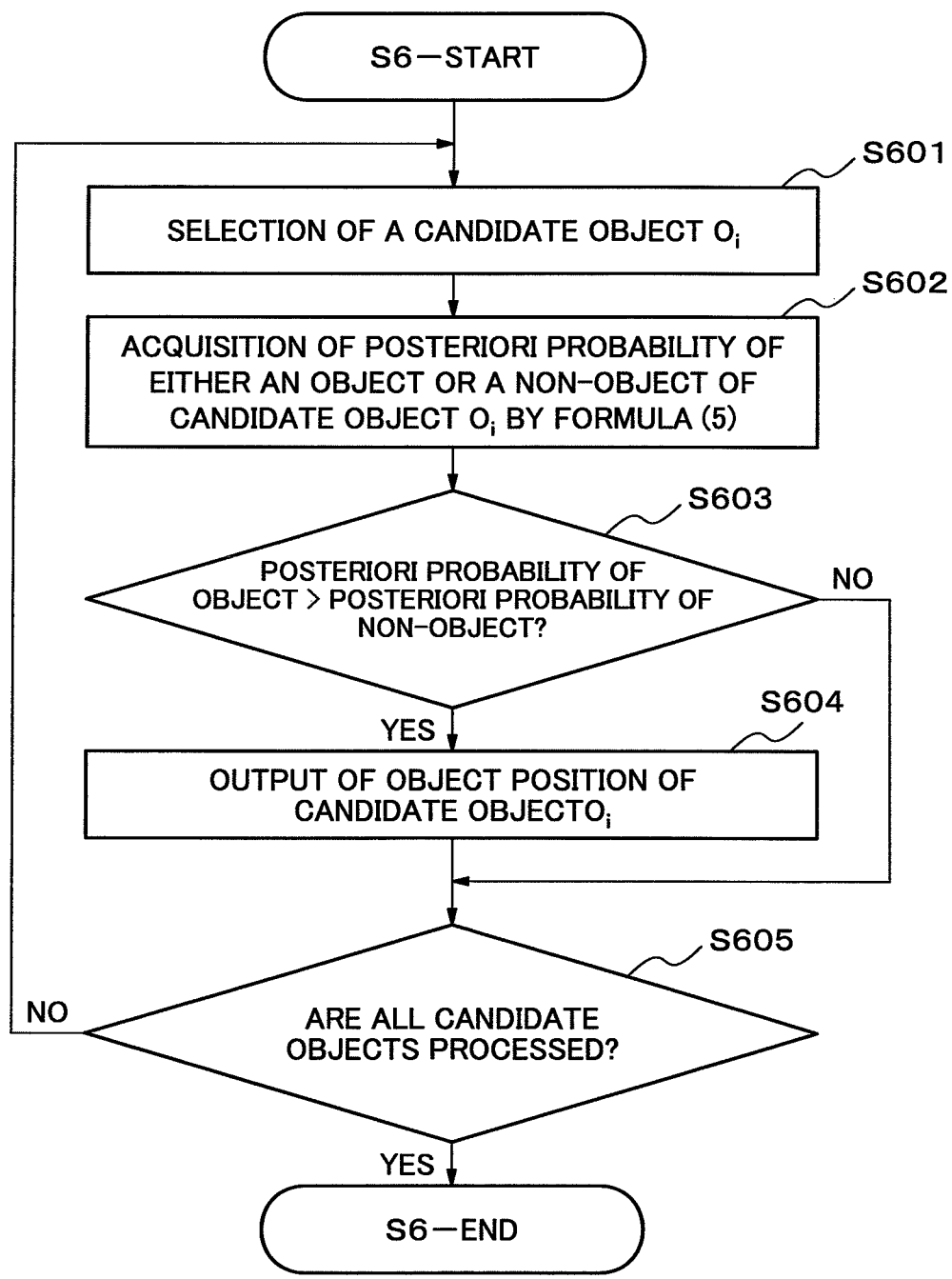
FIG. 14 is a flowchart showing operations according to the first embodiment of the present invention.

Then, the object candidate determination unit 35 acquires the posteriori probabilities of either object or non-object of the candidate object $O_i$ by the formula (5) using the degree of confidence $R_i$ which is acquired from the degree of confidence acquisition unit 33 and the degree of co-movement $G_i$ which is acquired from the degree of co-movement acquisition unit 34 (Step S602, FIG. 14).

Further, the object candidate determination unit 35 determines whether the posteriori probability of object is larger than the posteriori probability of non-object (Step S603, FIG. 14), and outputs the object position of the candidate object $O_i$ (Step S604, FIG. 14) in the case that the posteriori probability of object is larger than the posteriori probability of non-object (YES in Step S603, FIG. 14). In the case that the posteriori probability of object is not larger than the posteriori probability of non-object (NO in Step S603, FIG. 14) or the process of Step S604 (FIG. 14) has been completed, then the object candidate determination unit 35 checks whether the processes of Step S601 to Step S604 (FIG. 14) are executed to all the candidate objects $O_i$ (Step S605, FIG. 14). Then, in the case that the processes have not been complete for all the candidate objects $O_i$ (NO in Step S605, FIG. 14), the object candidate determination unit 35 repeats the processes of Step S601 to Step S605 (FIG. 14) until the processes will be completed.

In the case that the processes have been completed for all the candidate objects $O_i$ (YES in Step S605, FIG. 14), the processes of Step S6 are completed.

Next, effects of the first embodiment will be described.

According to the first embodiment, a possibility to estimate the ghost image object position as an incorrect object can be reduced, because of identifying the candidate object acquired by the visual cone intersection method as either object or non-object by using the posteriori probability which uses two indexes including the degree of confidence or the degree of co-movement, and of outputting only the object position of the candidate object which is determined as an object. In addition, the object position estimated by mistake can be reduced by using two indexes including the degree of confidence and the degree of co-movement.

Here, features of the degree of confidence can be expressed by facts that all the visual cones of which the ghost image objects are composed overlaps with the visual cones of which the actual object are composed, and that a possibility of the ghost image object may increase in accordance with increase of the overlaps.

In addition, features of the degree of co-movement can be expressed by facts that the ghost image object co-moves with the movement of the actual object, and that a possibility of the ghost image object may increase in accordance with increases of number of co-movement of the actual object for the ghost image object.

Second Exemplary Embodiment

Figure 15:
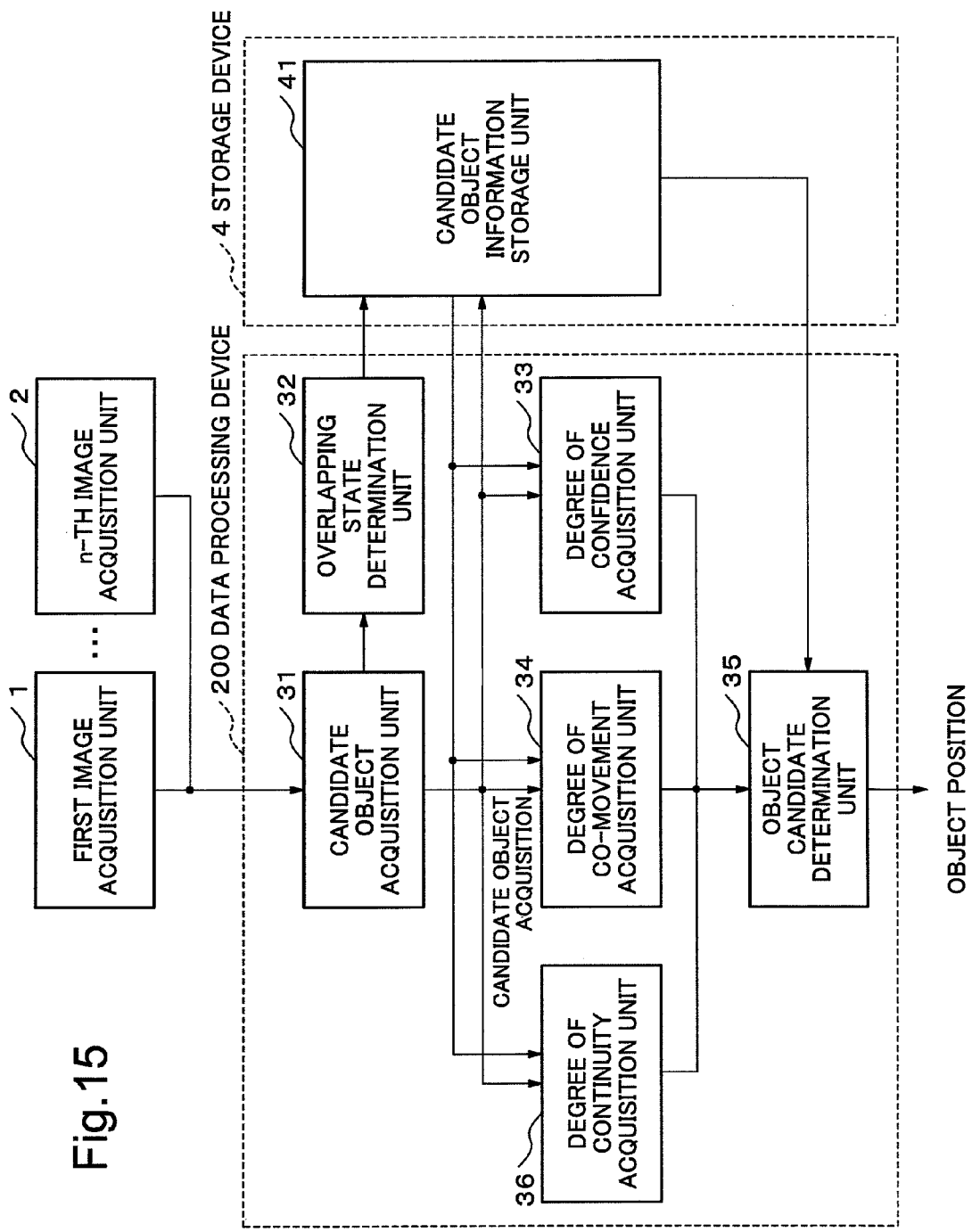
FIG. 15 is a block diagram showing a configuration according to a second embodiment of the present invention.

Next, the second embodiment will be described in detail with reference to drawings. FIG. 15 is the block diagram showing the configuration according to the second embodiment.

With referring to FIG. 15, the second embodiment includes a configuration where a degree of continuity acquisition unit 36 is added to a data processing device 2 according to the first embodiment which is shown in FIG. 2, as device 200 in FIG. 15. In addition, according to the second embodiment, part of the contents of the candidate object information storage unit 41, the degree of confidence acquisition unit 33 and the object candidate determination unit 35 are modified from the first embodiment.

Then, the contents of the candidate object information storage unit 41, the degree of confidence acquisition unit 33, the degree of continuity acquisition unit 36 and the object candidate determination unit 35 will be described according to the second embodiment.

The candidate object information storage unit 41 stores the degree of confidence $R_i$ acquired in the degree of confidence acquisition unit 33 in addition to the contents stored according to the first embodiment. That the candidate object information storage unit 41 also stores information on the images in the past, which was captured at the preceding time by the image acquisition unit, should be pointed out The degree of confidence acquisition unit 33 stores the acquired degree of confidence $R_i$ in the candidate object information storage unit 41 in addition to the contents stored according to the first embodiment.

The degree of continuity acquisition unit 36 acquires the degree of continuity which shows that the candidate object $O_i$ continuously exists in time series from the preceding candidate object $O_i$ for the current candidate object $O_j$. The degree of continuity acquisition unit 36 acquires the index of the degree of continuity by extracting the preceding candidate object $O_i$ which is located at a nearest position to the candidate object $O_i$ and is acquired at the preceding time by the candidate object acquisition unit. Concretely, this index is a distance $d_i$ (i.e. index in space direction) between the position of the current candidate object $O_i$ and the position of the preceding candidate object $O_i$, and the degree of confidence $R_i'$ (i.e. index in time direction) of the preceding candidate object $O_i$.

In the case that candidate object $O_i$ is an object, the candidate object $O_i$ continuously existed in the time-space. Namely, an effective visual cone intersection was existed in past at the vicinity of the present candidate object $O_i$. If the $d_i$ which is the index in space direction lines becomes smaller, then the circumstance means that the candidate object exists continuously. In addition, if the $R_i'$ which is an index in time direction becomes larger, then the circumstance means that the candidate object exists continuously. In the case that the candidate object $O_i$ is the ghost image object, then the object does not exist continuously in the time-space, and the $d_i$ which is the index of space direction is quite large compared with a case that an object exists continuously, or the $R_i'$ which is the index in time direction is quite small compared with a case that an object exists continuously.

Here, the degree of continuity acquisition unit 36 uses the information stored in the candidate object information storage unit 41 as the information for acquiring the index of the degree of continuity.

In addition, the distance $d_i$ and the degree of confidence $R_i'$ are assumed to be not independent each other under a class $\omega_i$ (i.e. either objects or non-objects ghost (image objects)), as described above.

The object candidate determination unit 35 adds the distance $d_i$ and the degree of confidence $R_i'$ acquired from the degree of continuity acquisition unit 36 to the first embodiment, and acquires the posteriori probabilities of either objects or non-objects of the candidate object $O_i$ by the formula (6).

$$P(\omega_i \mid R_i, G_i, d_i, R_i') = \frac{p(R_i, G_i, d_i, R_i' \mid \omega_i)P(\omega_i)}{p(R_i, G_i, d_i, R_i')} \quad (6)$$

$$= \frac{p(R_i \mid \omega_i)P(G_i \mid \omega_i)p(d_i, R_i' \mid \omega_i)P(\omega_i)}{\sum_{\omega_j=0}^{1}[p(R_i \mid \omega_j)p(G_i \mid \omega_j)p(d_i, R_i' \mid \omega_j)P(\omega_j)]}$$

Here, because $d_i$ and $R_i'$ are not independent, the function of $P(d_i, R_i' \mid \omega_i)$ remains in the formula (6).

The object candidate determination unit 35 selects a function for the probability density function $P(d_i, R_i' \mid \omega_i)$ so that, in the case of $\omega_i=1$, the probability density becomes higher in relation with shorter the distance $d_i$ and higher the degree of confidence $R_i'$, and the probability density becomes lower in relation with either longer the distance $d_i$ or lower the degree of confidence $R_i'$.

On the contrary, the object candidate determination unit 35 selects a function for the probability density function $P(d_i, R_i' \mid \omega_i)$ so that, in the case of $\omega_i=0$, the probability density becomes higher in relation with longer the distance $d_i$ and lower the degree of confidence $R_i'$, and the probability density becomes lower in relation with either shorter the distance $d_i$ or higher the degree of confidence $R_i'$. The object candidate determination unit 35 puts the integral value of the probability density function to 1. Here, although the probability density function is defined as mentioned above, the object candidate determination unit 35 may estimate by learning the probability density function.

Next, the operation of the second embodiment will be described in detail with reference to FIG. 12, FIG. 14, FIG. 15, FIG. 16 and FIG. 17.

Figure 16:
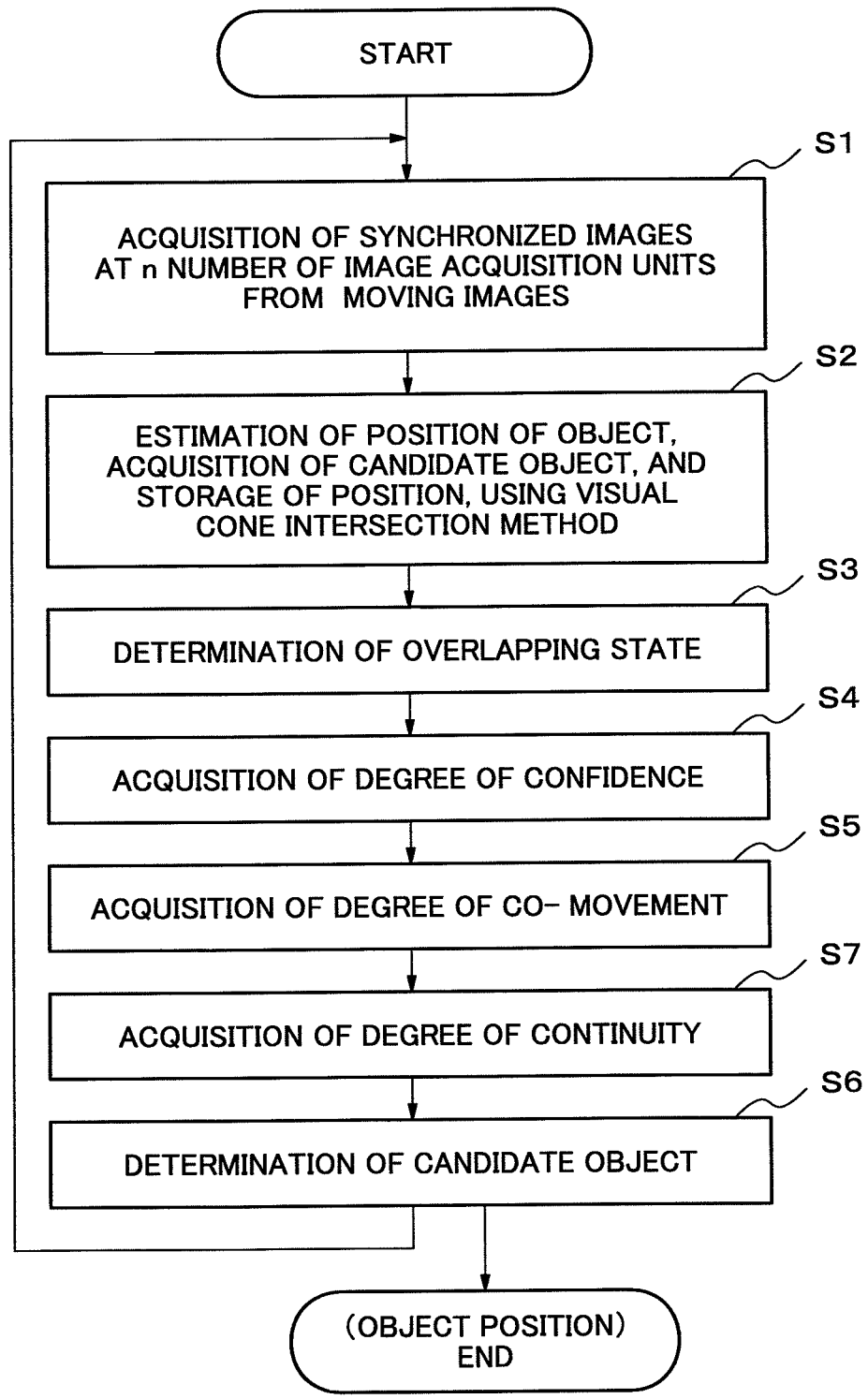
FIG. 16 is a flowchart showing operations according to the second embodiment of the present invention.

According to the second embodiment, an operation (Step S7) shown in FIG. 16 is added to the operation of the first embodiment shown in FIG. 8. In addition, the second embodiment is different from the first embodiment on the point that the second embodiment modifies an operation (Step S403) shown in FIG. 12 and an operation (Step S602) shown in FIG. 14. The description of other steps will be skipped, because these are identical with the operations of the first embodiment.

At first, the operation (Step S403) shown in FIG. 12 is modified as follows. By using $S_i$ acquired in Step S401 and $L_i$ acquired in Step S402, the degree of confidence acquisition unit 33 calculates and acquires the degree of confidence $R_i$ by the formula (2), and stores in the candidate object information storage unit 41 (Step S403).

Next, the operation of Step S7 shown in FIG. 16 is added to FIG. 8.

The degree of continuity acquisition unit 36 acquires the degree of continuity for the candidate object $O_i$ which means that whether the candidate object $O_i$ exists continuously in the time-space from the preceding candidate object $O_i$ (Step S7, FIG. 16).

Step S7 will be further described in detail with reference to the flowchart shown in FIG. 17. The degree of continuity acquisition unit 36 selects one of candidate object $O_i$ which is under a target of the process (Step S701, FIG. 17), and extracts the information on the preceding candidate object $O_i$ which the candidate object acquisition unit acquired at the preceding time and is located at a nearest position to the current candidate object $O_i$ from the candidate object information storage unit 41 (Step S702, FIG. 17).

Figure 17:
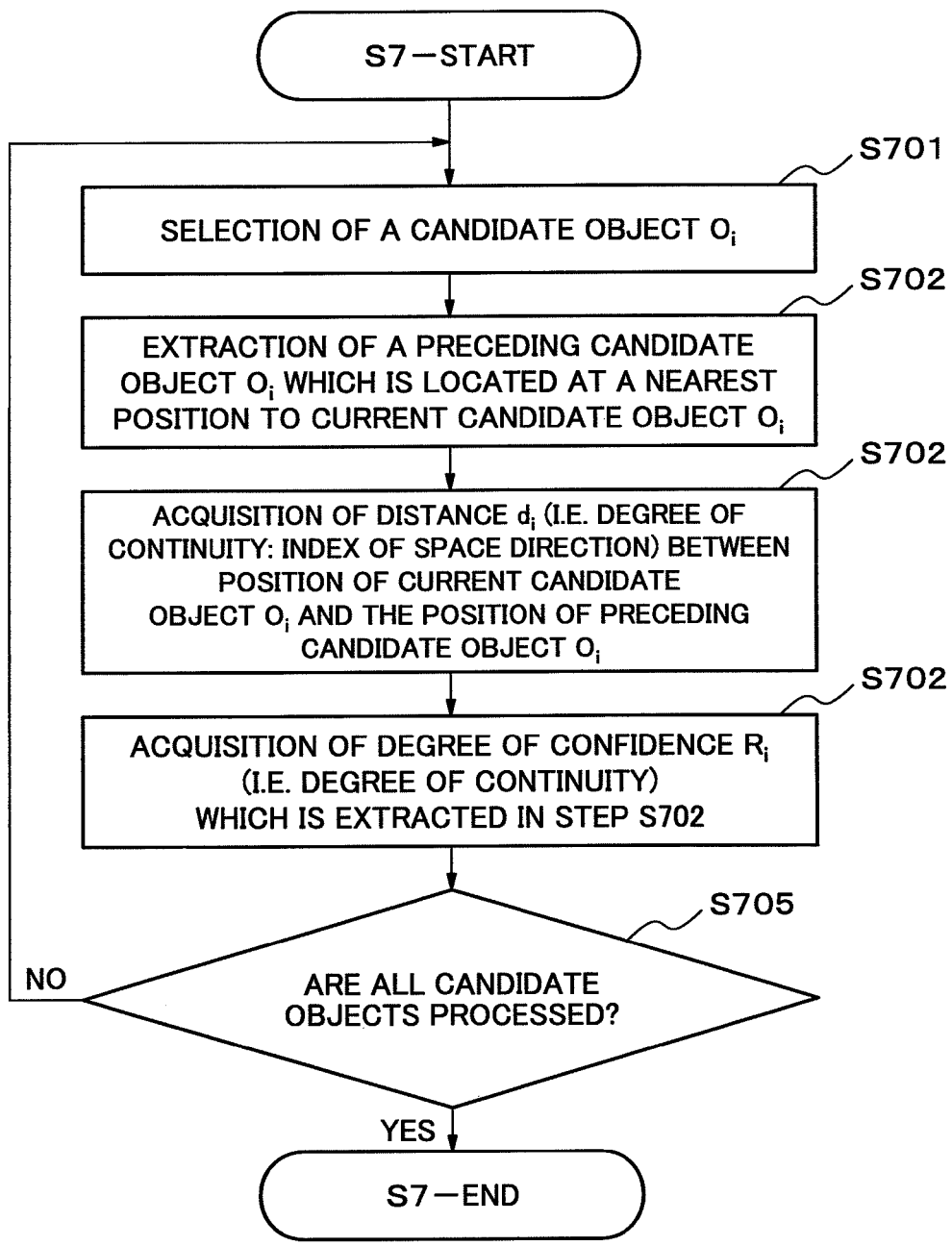
FIG. 17 is a flowchart showing operations according to the second embodiment of the present invention.

Next, the degree of continuity acquisition unit 36 calculates and acquires the distance $d_i$ (i.e. degree of continuity: index of space direction) between the position of the current candidate object $O_i$ and the position of the preceding candidate object $O_i$ (Step S703, FIG. 17). In addition, the degree of continuity acquisition unit 36 acquires the degree of confidence $R_i'$ (i.e. degree of continuity: index in time direction), which is extracted in Step S702, of the preceding candidate object $O_i$ that the candidate object acquisition unit acquired at the preceding time from the candidate object information storage unit 41 (Step S704, FIG. 17).

If the process of Step S704 (FIG. 17) has been completed, the degree of continuity acquisition unit 36 checks whether the processes Step S701 to Step S704 (FIG. 17) are executed for all the candidate objects $O_i$ (Step S705, FIG. 17). In the case that the processes have not been completed for all the candidate objects $O_i$ (NO in Step S705, FIG. 17), the degree of continuity acquisition unit 36 repeats the processes Step S701 to Step S705 (FIG. 17) until the processes will have been completed. If all the processes have been completed for all the candidate objects $O_i$ (YES in Step S705, FIG. 17), the degree of continuity acquisition unit 36 completes the process of Step S7.

Finally, in the embodiment, the operation (Step S602, FIG. 14) shown in FIG. 14 is modified as follows. In Step S602, the object candidate determination unit 35 acquires the posteriori probability of either an object or a non-object of the candidate object $O_i$ by the formula (6) using the degree of confidence $R_i$ acquired from the degree of confidence acquisition unit 33, the degree of co-movement $G^i$ acquired from the degree of co-movement acquisition unit 34, the distance $d_i$ acquired from the degree of continuity acquisition unit 36 and the degree of confidence $R_j'$ of the preceding candidate object $O_j$.

Next, the effect of the second embodiment will be described. The second embodiment utilized a feature that the actual object exists continuously in the time-space. Specifically, the object candidate determination unit 35 calculates the posteriori probability after adding two indexes including the distance between the current candidate object and the preceding candidate object corresponding to the current candidate object and the degree of confidence of the preceding candidate object, to those indexes used in the first embodiment. Then, using the result, the object candidate determination unit 35 identifies whether the candidate object, which is acquired by the visual cone intersection method, is either an object or a non-object. Because the object candidate determination unit 35 is constituted so that, the object position of the candidate object which is determined as an object may be outputted, incorrect estimation of the object position as the ghost image object can be reduced.

Third Exemplary Embodiment

Figure 18:
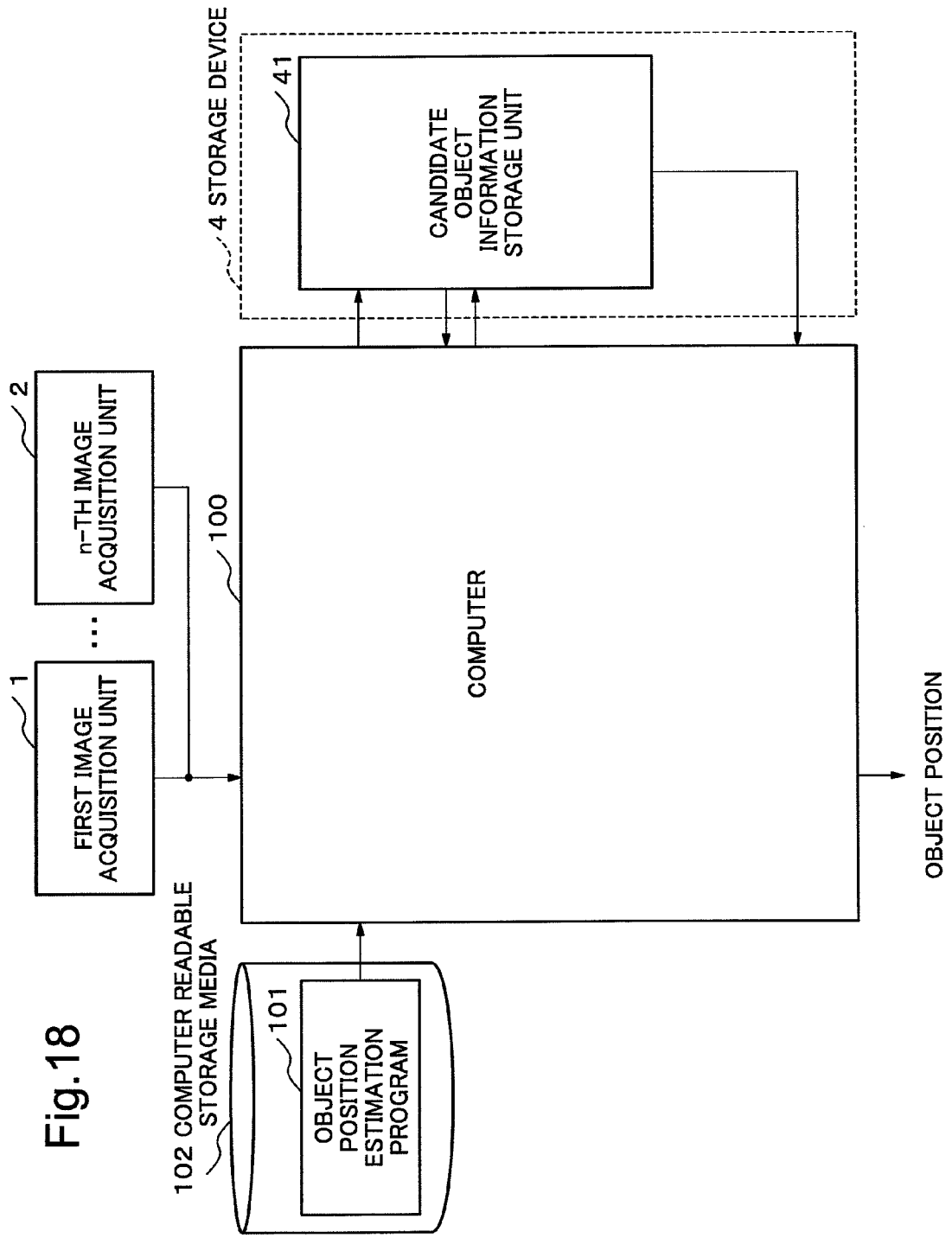
FIG. 18 is a block diagram showing a configuration according to a third embodiment of the present invention.

Next, the third embodiment will be described in detail with reference to a drawing. With referring to FIG. 18, the third embodiment is similar to the first embodiment in a sense that the first image acquisition unit 1, the n-th image acquisition units 2 and the storage device 4 having the candidate object information storage units 41 are included in this embodiment, and in the third embodiment these are connected with a computer 100. In addition, a computer readable storage media 102, which stores an object position estimation program 101, is connected to the computer 100.

The computer readable storage media 102 is composed of magnetic disks or semiconductor memories or the like, and the object position estimation program 101, which is stored in the computer readable storage media 102, will be read by the computer 100 when the computer 100 is started up. As the computer 100 can be forced with the program to execute functions corresponding to each unit 31 to 35 in the data processing device 3 in the first embodiment mentioned above, the processes can be executed as shown in FIGS. 8 to 14.

In the embodiment, even though the object position estimation device according to the first embodiment using the computer and the program is realized, the object position estimation device according to the second embodiment using the computer and the program is also realized.

In addition, according to the above-mentioned embodiment, for the object position acquired by the visual cone intersection method, a risk can be reduced wherein the object candidate determination unit 35 estimates incorrect object position assuming that the ghost image object is an existing object.

The reason is because, the object candidate determination unit 35 identifies either an actual object or a ghost image object using the degree of confidence or the degree of co-movement or the both indexes, and excludes the ghost image objects from the object position acquired by the visual cone intersection method. Here, features of the degree of confidence can be expressed by facts that all the visual cones of which the ghost image objects are composed overlaps with the visual cones of which the actual object are composed, and that a possibility of the ghost image object may increase in accordance with increase of the overlaps. In addition, features of the degree of co-movement can be expressed by facts that the ghost image object co-moves with the movement of the actual object, and that a possibility of the ghost image object may increase in accordance with increases of number of co-movement of the actual object for the ghost image object.

Other Exemplary Embodiments

In addition, the present invention may includes an overlapping state determination unit 32 which acquires number of visual cones which are determined to be overlapped with other candidate objects for the candidate objects based on the information stored in the candidate object information storage unit 41, and a degree of confidence acquisition unit which acquires a reliability, which is calculated based on the number, as a index of the degree of confidence for the candidate objects.

In addition, the present invention may includes a degree of continuity acquisition unit which acquires for the candidate object the index as the degree of continuity which is comprising of distance between the current candidate object and the preceding candidate object corresponding to the candidate object, and the degree of confidence representing the reliability of the visual cone intersection information of the preceding candidate object based on a fact that the actual objects exist continuously in time-space.

In addition, the degree of co-movement acquisition unit according to the present invention may acquire number of visual cones including other candidate objects which co-move with the movement of the candidate object, and calculate the degree of co-movement by subtracting reciprocal value which obtained by adding 1 to the number, multiplied by prefixed coefficient from 1.

In addition, the degree of confidence acquisition unit according to the present invention may acquire the degree of confidence by the following Procedure a: to Procedure c:

Procedure a: The degree of confidence acquisition unit acquires number of visual cones which is determined to have clear field of view in the visual cone acquired based on the captured image of the candidate object and number of visual cones which is determined to be overlapped with other candidate objects in the visual cone acquired based on the captured image of the candidate object.

Procedure b: The degree of confidence acquisition unit sets the value of the degree of confidence to 1, in the case that the respective numbers of visual cones determined in the Procedure a: are different.

Procedure c: The degree of confidence acquisition units set the value of the degree of confidence to a reciprocal value of number of visual cones, which is determined to be overlapped, multiplied by a prefixed coefficient, in the case that the respective numbers of visual cones determined in the Procedure a: are the same. In addition, the acquisition of the preceding candidate object by the degree of continuity acquisition unit according to the present invention may includes extracting and acquiring the preceding candidate object
which is located at a nearest position to the current candidate object and captured synchronously among the image capturing units.

In addition, the present invention may includes the degree of confidence acquisition step, which is comprising of acquiring number of visual cones which are determined to be overlapped with other candidate objects for the candidate objects based on the information stored in the candidate object information storage step, by an overlapping state determination unit 32, and acquiring a reliability,
which is calculated based on the number
as a index of the degree of confidence for the candidate objects.

In addition,
the present invention may includes a degree of continuity acquisition step
wherein the index as the degree of continuity
which is comprised of distance between the current candidate object and
the preceding candidate object corresponding to that, and the degree of confidence representing the reliability of the visual cone intersection information of the preceding candidate object is acquired for the candidate object, based on a fact that the actual object existing continuously in time-space.

In addition, the degree of co-movement acquisition step according to the present invention may acquire number of visual cones including other candidate objects which co-move with the movement of the candidate object, and calculate the degree of co-movement by subtracting the reciprocal of the value obtained by adding 1 to the number, multiplied by prefixed coefficient, from 1.

In addition, the degree of confidence acquisition step according to the present invention may acquire a degree of confidence by the following Step a: to Step c:

Step a: The degree of confidence acquisition unit acquires number of visual cones which is determined to have clear field of view in the visual cone acquired based on the captured image of the candidate object and number of visual cones which is determined to be overlapped with other candidate objects in the visual cone acquired based on the captured image of the candidate object.

Step b: The degree of confidence acquisition unit sets value of the degree of confidence to 1, in case that the respective numbers of visual cones determined in the Step a: are different.

Step c: The degree of confidence acquisition units set value of the degree of confidence to a reciprocal of number of visual cones, which is determined to be overlapped, multiplied by a prefixed coefficient, in case that the respective numbers of visual cones determined in the Step a: are the same.

In addition, the acquisition of the preceding candidate object in the degree of continuity acquisition step according to the present invention may includes extracting and acquiring the preceding candidate object which was located at a nearest position to the current candidate object and was synchronously captured among the image capturing units.

In addition, the present invention may force the object position estimation device to execute the degree of confidence acquisition process with a software program, to acquire number of visual cones which are determined to be overlapped with other candidate objects for the candidate objects based on the information stored in the candidate object information storage unit 41, by the overlapping state determination unit 32, and to acquires a reliability of the visual cone intersection information, which is calculated based on the number, as a index of the degree of confidence for the candidate objects.

In addition, the present invention may force the object position estimation device with a software program to executes the degree of continuity acquisition process which acquires for the candidate object index as the degree of continuity which is comprising of distance between current candidate object and preceding candidate object corresponding to that, and degree of confidence representing reliability of the visual cone intersection information of the preceding candidate object based on a fact that actual objects exist continuously in the time-space.

In addition, the degree of co-movement acquisition process according to the present invention may force the object position estimation device with a software program to acquire number of visual cones including other candidate objects which co-move with movement of the candidate object, and calculate the degree of co-movement by subtracting reciprocal of value obtained by adding 1 to the numbers of the visual cones including other candidate objects which co-move with the movement of the candidate object, multiplied by prefixed coefficient, from 1.

In addition, the degree of confidence acquisition process according to the present invention may force the object position estimation device with a software program to execute the followings:

Process a: The degree of confidence acquisition unit acquires number of visual cones which is determined to have clear field of view in the visual cone acquired based on captured image of the candidate object and number of visual cones which is determined to be overlapped with other candidate objects in the visual cones acquired based on the captured image of the candidate object.

Process b: The degree of confidence acquisition unit sets value of the degree of confidence to 1, in case that the respective number of visual cones determined in the Process a: are different.

Process c: The degree of confidence acquisition units set the value of the degree of confidence to a reciprocal of number of visual cones, which is determined to be overlapped with other candidate objects in the visual cones, multiplied by a prefixed coefficient, in case that the respective numbers of visual cones determined in the Process a: are the same.

In addition, the acquisition of the preceding candidate object in the degree of continuity acquisition process according to the present invention may force the object position estimation device with a software program to extract and acquire the preceding candidate object which located at a nearest position to the current candidate object and was synchronously captured among the image capturing units.

While having described an invention of the present application referring to the embodiments, the invention of the present application is not limited to the above mentioned embodiments. It is to be understood that to the configurations and details of the invention of the present application, various changes can be made within the scope of the invention of the present application by those skilled in the arts.

This application claims priority from Japanese Patent Application No. 2009-109827, filed on Apr. 28, 2009, the contents of which are incorporation herein by the reference in their entirety.

INDUSTRIAL APPLICABILITY

According to the present invention, a software program which forces a computer to execute the object position estimation device, the object position estimation method and the program can be applied to various uses including a intrusion detection in monitoring field, a detection of suspicious person, a detection of desertion of unidentified object, a removed luggage detection, a detection of tailgating, a device for detecting congestion and queue, a flow analysis in marketing field, a device of behavior analysis, a interface device of inputting object position from video camera or stored video, and a video camera or image retrieval device with trigger key of object position.

DESCRIPTION OF THE CODES 1 first image acquisition unit
2 n-th image acquisition unit
3 data processing device
4 storage device
31 candidate object acquisition unit
32 overlapping state determination unit
33 degree of confidence acquisition unit
34 degree of co-movement acquisition unit
35 object candidate determination unit
36 degree of continuity acquisition unit
41 candidate object information storage unit
100 computer
101 object position estimation program
102 computer readable storage media
200 data processing device

The invention claimed is:

1. An object position estimation device, comprising:
an object candidate acquisition unit which estimates object positions by a visual cone intersection method and acquires candidate objects;
an object candidate information storage unit which stores information on overlap among said candidate objects for a visual cone of objects which is acquired based on a captured image;
a degree of co-movement acquisition unit which—acquires a degree of co-movement of said candidate objects which is calculated based on a number of visual cones including other candidate objects which co-move with the movement of said candidate objects, or a degree of confidence acquisition unit which acquires a degree of confidence of said candidate objects which is calculated based on the number of visual cones which an overlap condition determining means determined that there is an overlap of said candidate objects with other candidate objects; and
a candidate object determination unit which identifies said candidate objects as either objects or non-objects by a posteriori probability which is calculated based on acquired said degree of co-movement or said degree of confidence and outputs position of said candidate objects which is determined as objects.

2. The object position estimation device according to claim 1, comprising:
a degree of continuity acquisition unit which acquires for said candidate objects degree of continuity comprising of a difference between current position of said candidate objects and precedes position of the candidate objects corresponding to said candidate objects and said degree of confidence of the preceding candidate objects corresponding to said candidate objects, wherein
said candidate object determination unit identifies said candidate as either objects or non-objects by posteriori probabilities which are calculated based on said degree of co-movement or on said degree of confidence or on said degree of continuity.

3. The object position estimation device according to claim 1, wherein said degree of co-movement is a value which is calculated by subtracting reciprocal of value obtained by adding 1 to the number of visual cones including other candidate objects which co-move with the movement of said candidate object, multiplied by prefixed coefficient, from 1.

4. The object position estimation device according to claim 1, wherein said degree of confidence acquisition unit:
sets said degree of confidence to 1 in the case that there is a difference between the number of visual cones which is determined to have clear field of view among the visual cones acquired based on the captured image of the candidate objects and the number of visual cones which is determined to be overlapped with the other candidate objects in the visual cones acquired based on the captured image of the candidate objects; and
sets said degree of confidence to reciprocal of the number of visual cones which is determined to be overlapped multiplied by a prefixed coefficient in the case that the number of visual cones which is determined to have clear field of view and the number of visual cones which is determined to be overlapped are the same.

5. The object position estimation device according to claim 2, wherein the degree of continuity acquisition unit, in the case that a plurality of preceding candidate objects which are corresponding to said candidate objects exist, then selects a preceding candidate object which is located at a nearest position to said current candidate object and is corresponding to said candidate object.

6. An object position estimation method, comprising
estimating an object position by a visual cone intersection method and acquiring a candidate objects,
storing information on overlap among said candidate objects for the visual cone of the objects acquired based on a captured image,
acquiring degree of co-movement which is calculated based on a number of visual cones including other candidate objects which co-move with movement of said candidate objects for said candidate objects or acquiring the number of visual cones which is determined to be overlapped with other candidate objects for said candidate objects based on stored said information on overlap and calculating a degree of confidence based on the number of said visual cones, identifying said candidate objects as either objects or non-objects by a posteriori probability which is calculated based on acquired said degree of co-movement or said degree of confidence, and outputting position of said candidate objects which are determined as objects.

7. The object position estimation method according to claim 6, comprising acquiring a degree of continuity which is comprising of a difference between current position of said candidate objects and preceding position of the candidate objects corresponding to said candidate object and said degree of confidence of the preceding candidate objects corresponding to said candidate objects, and identifying said candidate objects as either objects or non-objects by a posteriori probabilities which are calculated based on said degree of co-movement or on said degree of confidence or on said degree of continuity.

8. The object position estimation method according to claims 6, characterized wherein said degree of co-movement is calculated by subtracting reciprocal of value obtained by adding 1 to the number of visual cones including other candidate objects which co-moves with movement of said candidate object, multiplied by prefixed coefficient, from 1.

9. The object position estimation method according to claims 6, comprising setting said degree of confidence to 1 in the case that there is a difference between the number of visual cones which is determined to have clear field of view among the visual cones acquired based on a captured image of the candidate objects and the number of visual cones which is determined to be overlapped with the other candidate objects in the visual cones acquired based on the captured image of the candidate objects, and setting said degree of confidence to reciprocal of the number of visual cones which is determined to be overlapped multiplied by a prefixed coefficient in the case that the number of visual cones which is determined to have clear field of view and the number of visual cones which is determined to be overlapped are the same.

10. The object position estimation method according to claim 7, characterized wherein, a preceding candidate object which is located at a nearest position to said current candidate object and is corresponding to said candidate object is selected in the case that a plurality of preceding candidate objects which are corresponding to said candidate objects exist.

11. A non-transient computer-readable medium which stores a data management program causing a computer to execute:

a candidate object acquisition process wherein the object position estimation device estimates an object position by the visual cone intersection method and acquires a candidate object, a candidate object information storage process where the object position estimation device stores information on overlap among said candidate objects for the visual cone of the objects acquired based on a captured image, a degree of co-movement acquisition process where the object position estimation device acquires a degree of co-movement of said candidate objects which is calculated based on a number of visual cones including other candidate objects which co-move with the movement of said candidate objects, or a degree of confidence acquisition process where the object position estimation device acquires a degree of confidence of said candidate objects which is calculated based on the number of visual cones which an overlap condition determining means determined that there is an overlap of said candidate objects with other candidate objects based on information stored at said candidate object information storage process; and a candidate object determination process where the object position estimation device identifies said candidate objects as either objects or non-objects by a posteriori probability which is calculated based on acquired said degree of co-movement or said degree of confidence and outputs position of said candidate objects which is determined as objects.

12. The non-transient computer-readable medium according to claim 11 which stores a data management program causing a computer to execute:

a degree of continuity acquisition process where the object position estimation device acquires a degree of continuity comprising of a difference between current position of said current candidate object and preceding position of the candidate objects corresponding to said candidate objects and said degree of confidence of the preceding candidate objects corresponding to said candidate objects; and a candidate object determination process where the object position estimation device identifies said candidate as either objects or non-objects by posteriori probabilities which are calculated based on said degree of co-movement, or on said degree of confidence or on said degree of continuity and outputs position of said candidate objects which is determined as objects.

13. The non-transient computer-readable medium according to claim 11 which stores a data management program causing a computer to execute:

the object position estimation device calculates in said degree of co-movement acquisition process by subtracting a value which is acquired by reciprocal of value obtained by adding 1 to the number of visual cones including other candidate objects which co-moves with movement of said candidate objects, multiplied by prefixed coefficient, from 1.

14. The non-transient computer-readable medium according to claim 11 which stores a data management program causing a computer to execute, the object position estimation device sets said degree of confidence to 1 in said degree of confidence acquisition process, in the case that there is a difference between the number of visual cones which is determined to have clear field of view among the visual cones acquired based on the captured image of the candidate objects and the number of visual cones which is determined to be overlapped with other candidate objects in the visual cones acquired based on the captured image of the candidate objects; and the object position estimation device sets said degree of confidence to reciprocal of the number of visual cones which is determined to be overlapped multiplied by a prefixed coefficient in the case that the number of visual cones which is determined to have clear field of view and the number of visual cones which is determined to be overlapped are the same.

15. The non-transient computer-readable medium according to claim 12 which stores a data program causing a computer to execute the object position estimation device selects a preceding candidate object which is located at a nearest position to said current candidate objects and is corresponding to said candidate objects in the case that a plurality of positions in the past exist for said object, in the degree of continuity acquisition process.

* * * * *

UNITED STATES PATENT AND TRADEMARK OFFICE
CERTIFICATE OF CORRECTION

PATENT NO. : 8,885,879 B2
APPLICATION NO. : 13/265486
DATED : November 11, 2014
INVENTOR(S) : Hiroo Ikeda Page 1 of 1

It is certified that error appears in the above-identified patent and that said Letters Patent is hereby corrected as shown below:

In the Specification

Column 6, Line 65: Delete "Oi" and insert -- $O_i$ --

In the Claims

Column 21, Line 63: In Claim 1, delete "which-acquires" and insert -- which acquires --

Column 23, Line 23: In Claim 8, delete "Claims 6," and insert -- Claim 6, --

Column 23, Line 30: In Claim 9, delete "Claims 6," and insert -- Claim 6, --

Signed and Sealed this
Twenty-third Day of June, 2015

Michelle K. Lee
*Director of the United States Patent and Trademark Office*